(12) United States Patent
Sakamoto

(10) Patent No.: US 7,643,221 B2
(45) Date of Patent: Jan. 5, 2010

(54) ZOOM LENS AND IMAGE PICKUP APPARATUS HAVING THE SAME

(75) Inventor: Masaru Sakamoto, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/184,967

(22) Filed: Aug. 1, 2008

(65) Prior Publication Data

US 2009/0034091 A1    Feb. 5, 2009

(30) Foreign Application Priority Data

Aug. 2, 2007   (JP)   ............... 2007-201727

(51) Int. Cl.
*G02B 15/14*   (2006.01)
(52) U.S. Cl. ...................... 359/682; 359/672
(58) Field of Classification Search ............. 359/676, 359/686–688, 672–675; 396/72–88; 348/240.99–240.3, 348/335–369
See application file for complete search history.

(56) References Cited

U.S. PATENT DOCUMENTS 4,451,124 A * 5/1984 Basista et al. ............... 359/687
4,629,293 A * 12/1986 Mihara ........................ 359/688
4,701,034 A * 10/1987 Mihara ........................ 359/688
5,831,771 A * 11/1998 Suzuki ........................ 359/689
6,545,818 B2    4/2003 Usui
2006/0221460 A1   10/2006 Saruwatari

FOREIGN PATENT DOCUMENTS

| JP | 63-237020 | 10/1988 |
|---|---|---|
| JP | 2000-89109 | 3/2000 |
| JP | 2004-325712 | 11/2004 |

* cited by examiner

*Primary Examiner*—Darryl J Collins
(74) *Attorney, Agent, or Firm*—Canon USA Inc IP Div

(57) ABSTRACT

A zoom lens comprises a first lens unit that does not move for zooming and that has a positive refractive power, a second lens unit that is configure to move to an image side during zooming from a wide angle end to a telephoto end and that has a negative refractive power, a third lens unit that is configured to reduce image plane variation due to zooming, and a fourth lens unit that does not move for zooming. The fourth lens unit comprises a fourth-F unit, a fourth-B1 unit, and a fourth-B2 unit. The average Abbe number of positive lens and negative lenses in the fourth-B1 unit and the average Abbe number of positive negative lenses in the fourth-B2 unit are set appropriately.

7 Claims, 26 Drawing Sheets

ZOOM LENS AND IMAGE PICKUP APPARATUS HAVING THE SAME

BACKGROUND OF THE INVENTION

1. Field of the Invention

The present invention relates to a zoom lens and an image pickup apparatus including the zoom lens, for use in a camera such as for example a broadcast television camera, a video camera, a digital still camera, or a silver film camera.

2. Description of the Related Art

In recent years, zoom lenses having a high aperture ratio, a high zoom ratio, a wide angle of view, and high optical performance have been demanded for image pickup apparatuses such as television cameras, silver film cameras, digital cameras, and video cameras.

In an image pickup apparatus such as a broadcast color television camera, since a color separation optical system and various filters are provided on the front side (object side) of an image pickup unit, a zoom lens is required to have a long back focus.

As a zoom lens having a high aperture ratio, a wide angle of view, a high zoom ratio, and a long back focus, a positive lead type four-unit zoom lens is known in which a lens unit having a positive refractive power is provided closest to the object side of the lens.

This four-unit zoom lens includes a first lens unit including a focus lens unit and having a positive refractive power, a second lens unit for zooming that has a negative refractive power, a third lens unit having a positive refractive power so as to correct image plane variation due to zooming, and a fourth lens unit for imaging that has a positive refractive power. The first to fourth lens units are arranged in that order from the object side to the image side.

Japanese Patent Laid Open Nos. 63-237020 and 2000-89109 and U.S. Pat. No. 6,545,818 disclose a positive lead type four-unit zoom lens having a high aperture ratio and a high zoom ratio. The four-unit zoom lens has an angle of view 2ω of 78° to 96° at a wide angle end, an f-number of 1.7 to 2.0, and a zoom ratio of 8 to 12.

In the above-described four-unit zoom lenses, it is necessary to properly set the refractive powers of the lens units and the lens layout in order to ensure a high aperture ratio, a high zoom ratio, and an angle of view 2ω of 78° or more at the wide angle end, and to achieve high optical performance over the entire zoom range.

For example, if the lens layout of the fourth lens unit for imaging is not optimized, it is difficult to reduce variations in chromatic aberration, spherical aberration, halo, coma and color difference of spherical aberration and to improve the zoom ratio and performance while ensuring a predetermined back focus.

In particular, when a lens unit (extender lens) for changing the focal length range of the entire system can be inserted and removed between an object-side lens unit and an image-side lens unit on the optical path of the fourth lens unit, it is important to properly set the lens layout of the image-side lens in the fourth lens unit.

If the lens layout of the image-side lens unit is not optimized, it is difficult to obtain a zoom lens that properly corrects lateral chromatic aberration at the wide angle end and that has high optical performance, a wide angle of view, and a high zoom ratio.

SUMMARY OF THE INVENTION

A zoom lens according to an embodiment of the present invention comprises a first lens unit that does not move for zooming and that has a positive refractive power; a second lens unit that is configured to move to an image side during zooming from a wide angle end to a telephoto end and that has a negative refractive power; a third lens unit that is configured to reduce image plane variation due to zooming; and a fourth lens unit that does not move for zooming. The first to fourth lens units are arranged in that order from an object side to the image side of the zoom lens. The fourth lens unit comprises a fourth-F unit and a fourth-B unit that are arranged in that order from the object side and opposite to each other across the longest air gap in the fourth lens unit. The fourth-B unit comprises two negative lenses and at least three positive lenses, and comprises a fourth-B1 unit and a fourth-B2 unit. The center of a thickness of at least one lens included in the fourth-B1 unit is closer to the object side than the center of a total length of the fourth-B unit, and the center of the thickness of at least one lens included in the fourth-B2 unit is closer to the image side than the center of the total length of the fourth-B unit. Each of the fourth-B1 unit and the fourth-B2 unit includes at least one negative lens and at least one positive lens. The following conditions are satisfied:

$$0.50 < v1p/v1n < 1.10$$

$$2.30 < v2p/v2n$$

where v1p and v2p represent an average of Abbe numbers of materials of the positive lens in the fourth-B1 unit and the positive lens in the fourth-B2 unit respectively, and v1n and v2n represent an average of Abbe numbers of materials of the negative lens in the fourth-B1 unit and the negative lens in the fourth-B2 unit respectively.

Further features of the present invention will become apparent from the following description of exemplary embodiments with reference to the attached drawings.

DESCRIPTION OF THE EMBODIMENTS

An embodiment of the present invention provides a zoom lens that can correct aberrations and has high optical performance over the entire zoom range from a wide angle end to a telephoto end with a high zoom ratio, and an image pickup apparatus including the zoom lens.

A zoom lens and an image pickup apparatus including the zoom lens according to an embodiment of the present invention will now be described.

The zoom lens according to the embodiment comprises (includes) a first lens unit F having a positive refractive power, a second lens unit V having a negative refractive power, a third lens unit C having a positive or negative refractive power, and a fourth lens unit R. The first to fourth lens units are arranged in that order from an object side (enlargement side, enlargement conjugate side, front side) to an image side (reduction side, reduction conjugate side, rear side) of the zoom lens. The first lens unit F includes a focusing lens unit and does not move for zooming. The second lens unit V moves monotonically to the image side for zooming from a wide angle end (short focal-length end) to a telephoto end (long focal-length end) of the zooming range. At least part of the third lens unit C moves (along a nonlinear locus) so as to reduce (correct) image plane variation due to zooming. The fourth lens unit R does not move for zooming. Herein, the expression "along a nonlinear locus (trajectory, history)" means that the moving amount of the third lens unit C nonlinearly changes in response to the change in focal length during zooming.

In the fourth lens unit R, a lens unit 4F and a lens unit 4B are respectively provided at the object side and the image side respectively so that the longest air gap in the fourth lens unit is provided therebetween. In other words, the lens unit 4F and the lens unit 4B face each other across the longest air gap in the fourth lens unit R. The lens unit 4F is provided on the object side of the longest air gap, and the lens unit 4B is provided on the image side of the longest air gap.

Between the lens units 4F and 4B in the fourth lens unit R, a lens unit (extender lens) is provided. The extender lens can be inserted into and removed from the optical path in order to change the focal-distance range of the total lens system.

Figure 1:
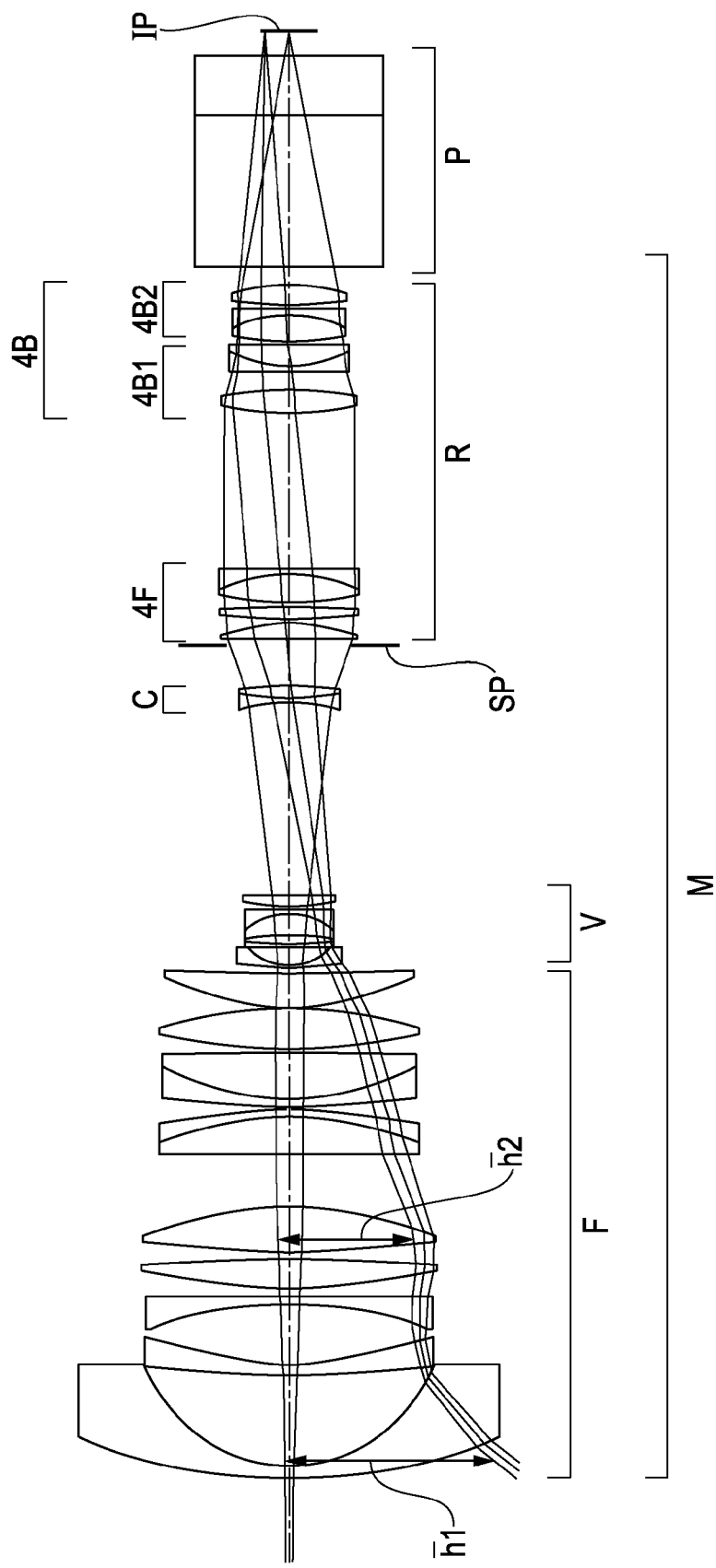
FIG. 1 is a cross-sectional view of a zoom lens at a wide angle end according to a first exemplary embodiment of the present invention.
Figure 2:
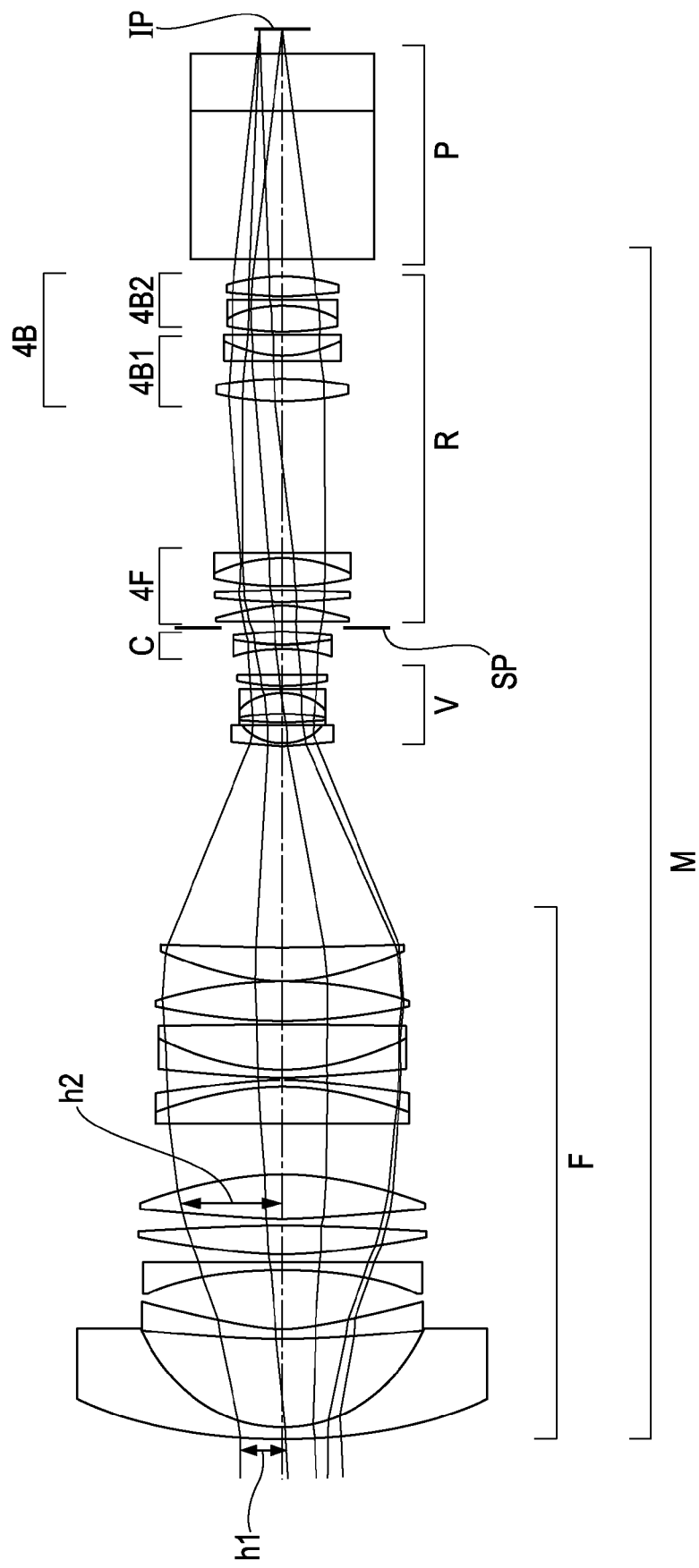
FIG. 2 is a cross-sectional view of the zoom lens at a telephoto end in the first exemplary embodiment.

FIGS. 1 and 2 are cross-sectional views of the zoom lens at the wide angle end and the telephoto end, respectively, in the first exemplary embodiment.

Figure 3:
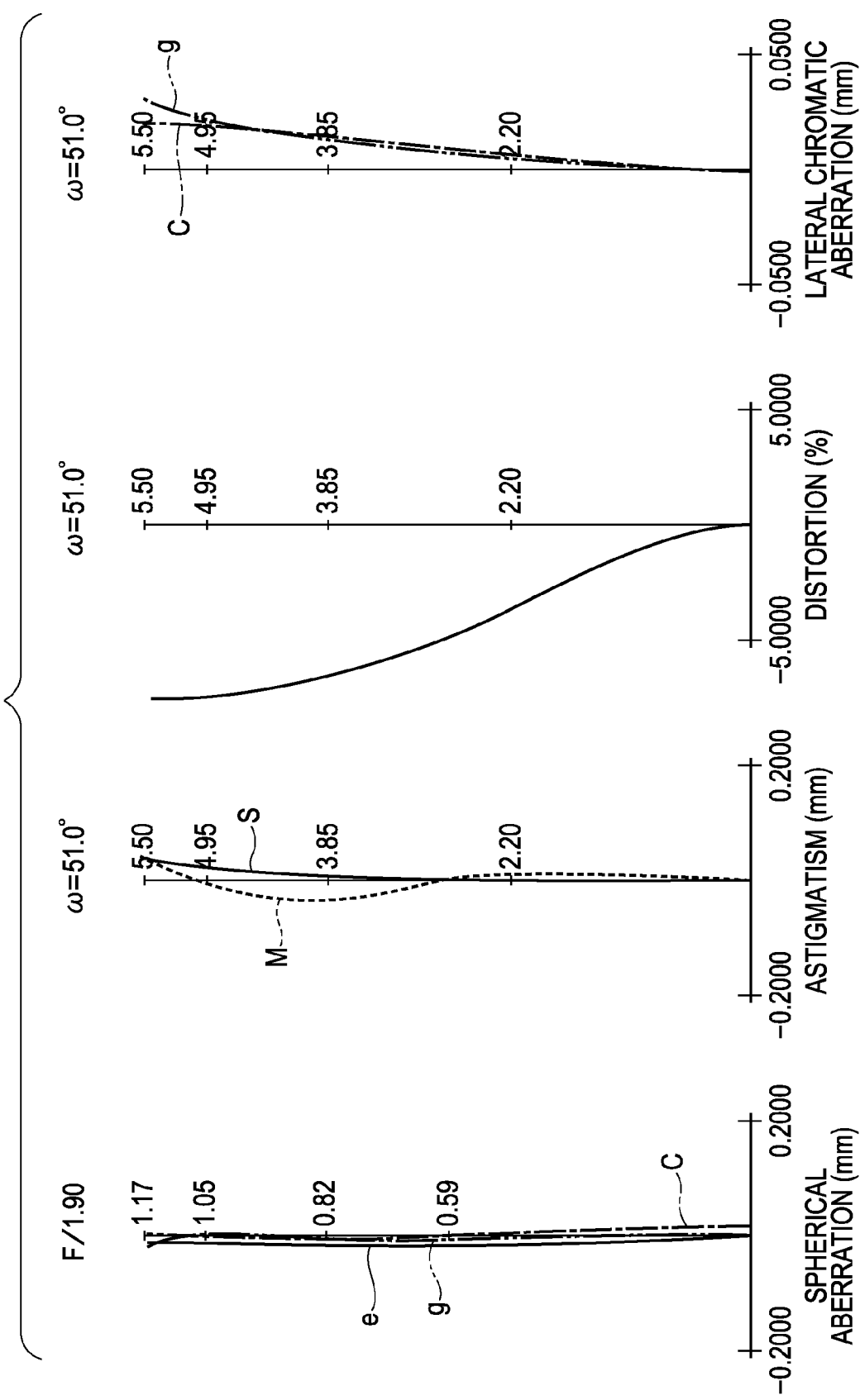
FIG. 3 includes aberration diagrams at the wide angle end in the first exemplary embodiment.
Figure 4:
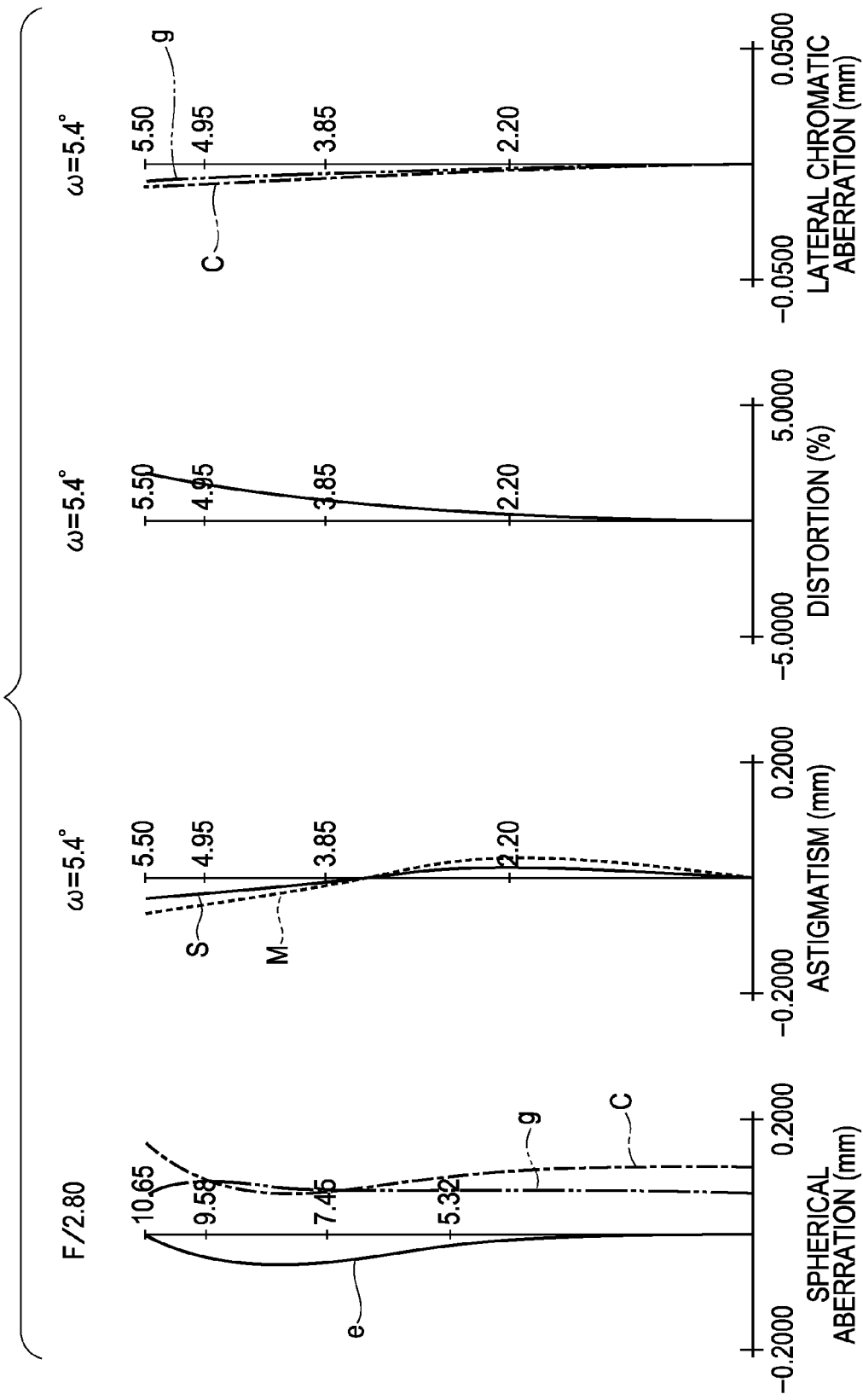
FIG. 4 includes aberration diagrams at the telephoto end in the first exemplary embodiment.

FIGS. 3 and 4 include aberration diagrams of the zoom lens when an object at infinity is in focus in the first exemplary embodiment.

Figure 5:
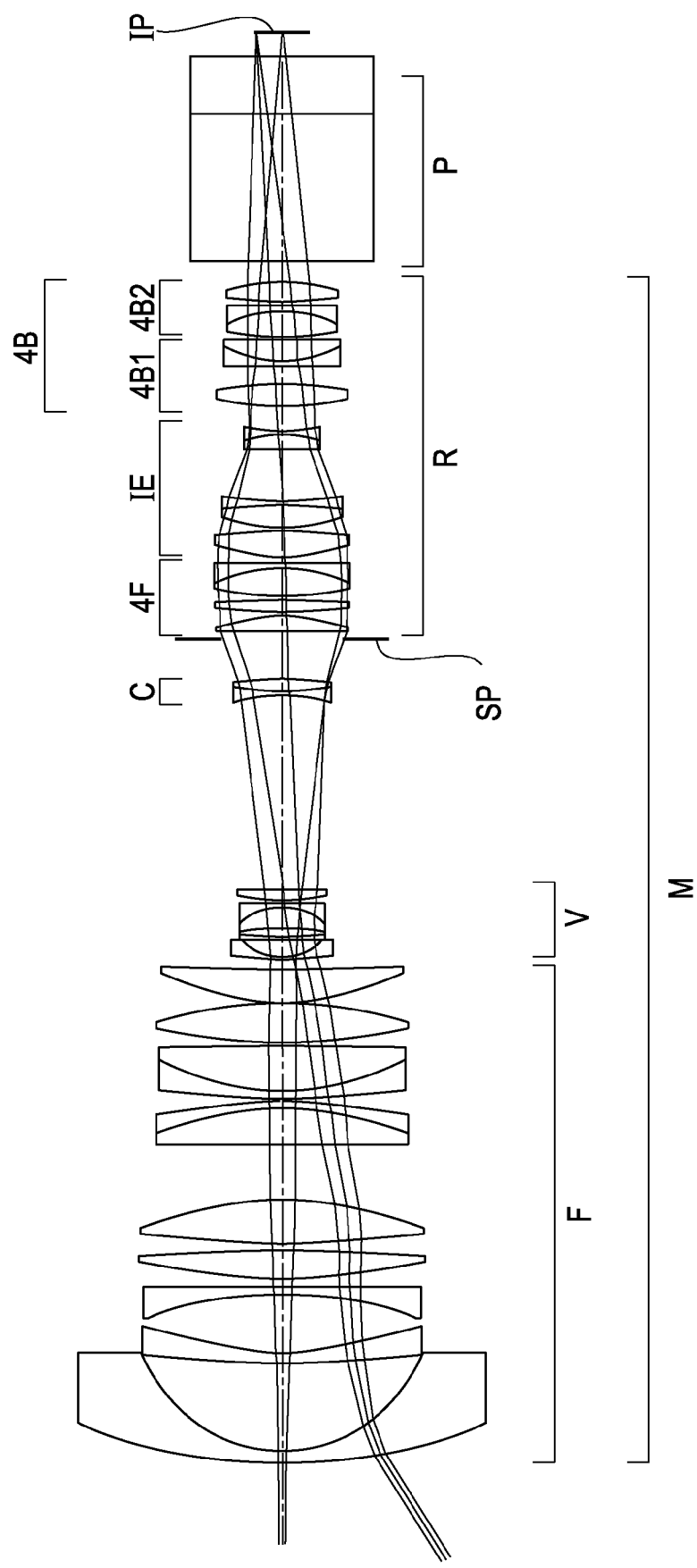
FIG. 5 is a cross-sectional view of the zoom lens at the wide angle end in the first exemplary embodiment when a lens unit is inserted.

FIG. 5 is a cross-sectional view of the zoom lens at the wide angle end when the extender lens IE (lens unit) is inserted in the fourth lens unit R.

Figure 6:
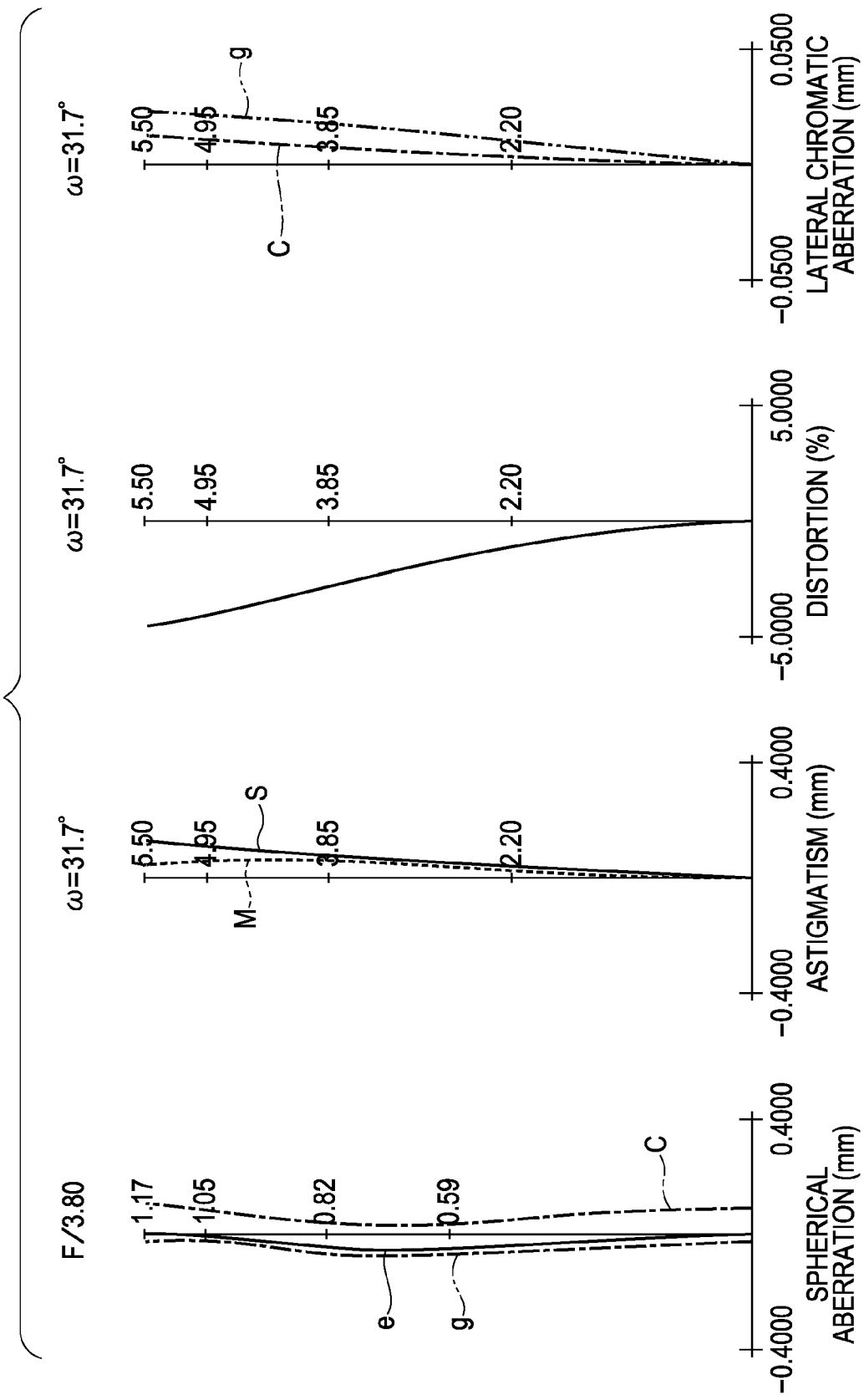
FIG. 6 includes aberration diagrams at the wide angle end in the first exemplary embodiment when the lens unit is inserted.
Figure 7:
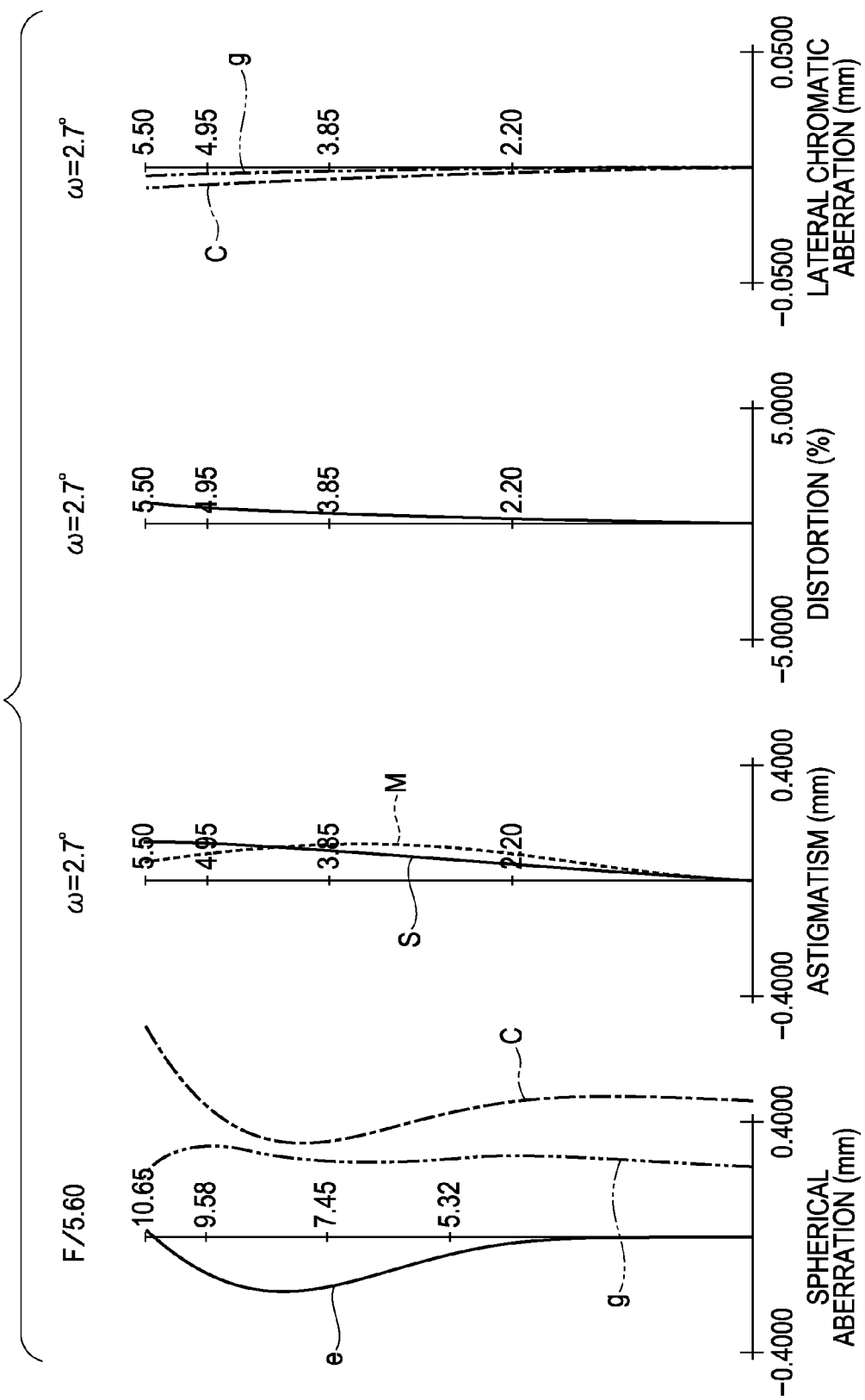
FIG. 7 includes aberration diagrams at the telephoto end in the first exemplary embodiment when the lens unit is inserted.

FIGS. 6 and 7 include aberration diagrams at the wide angle end and the telephoto end when an object at infinity is in focus and the extender lens is inserted in the fourth lens unit R.

Figure 8:
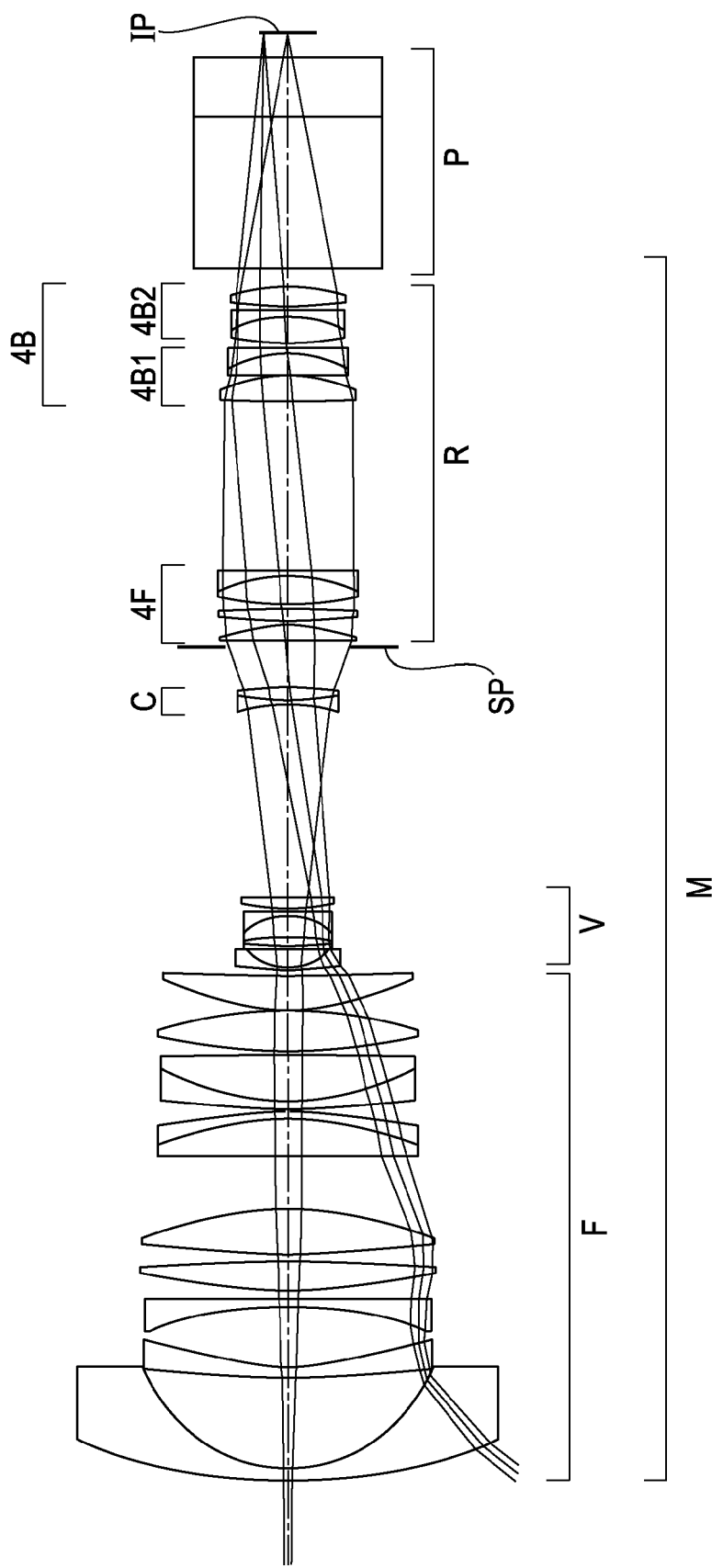
FIG. 8 is a cross-sectional view of a zoom lens at a wide angle end according to a second exemplary embodiment.

FIG. 8 is a cross-sectional view of a zoom lens at the wide angle end according to a second exemplary embodiment of the present invention.

Figure 9:
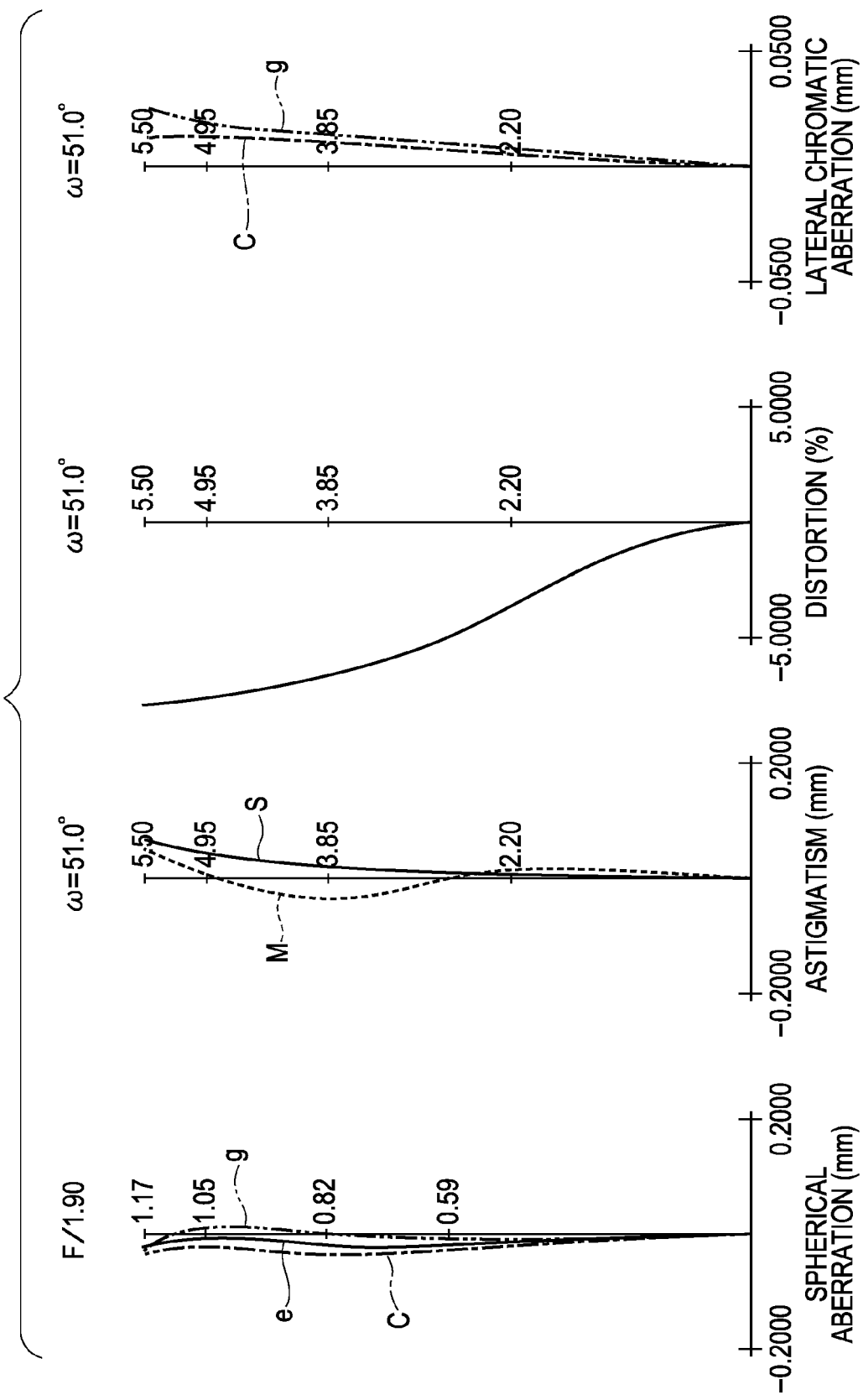
FIG. 9 includes aberration diagrams at the wide angle end in second exemplary embodiment.
Figure 10:
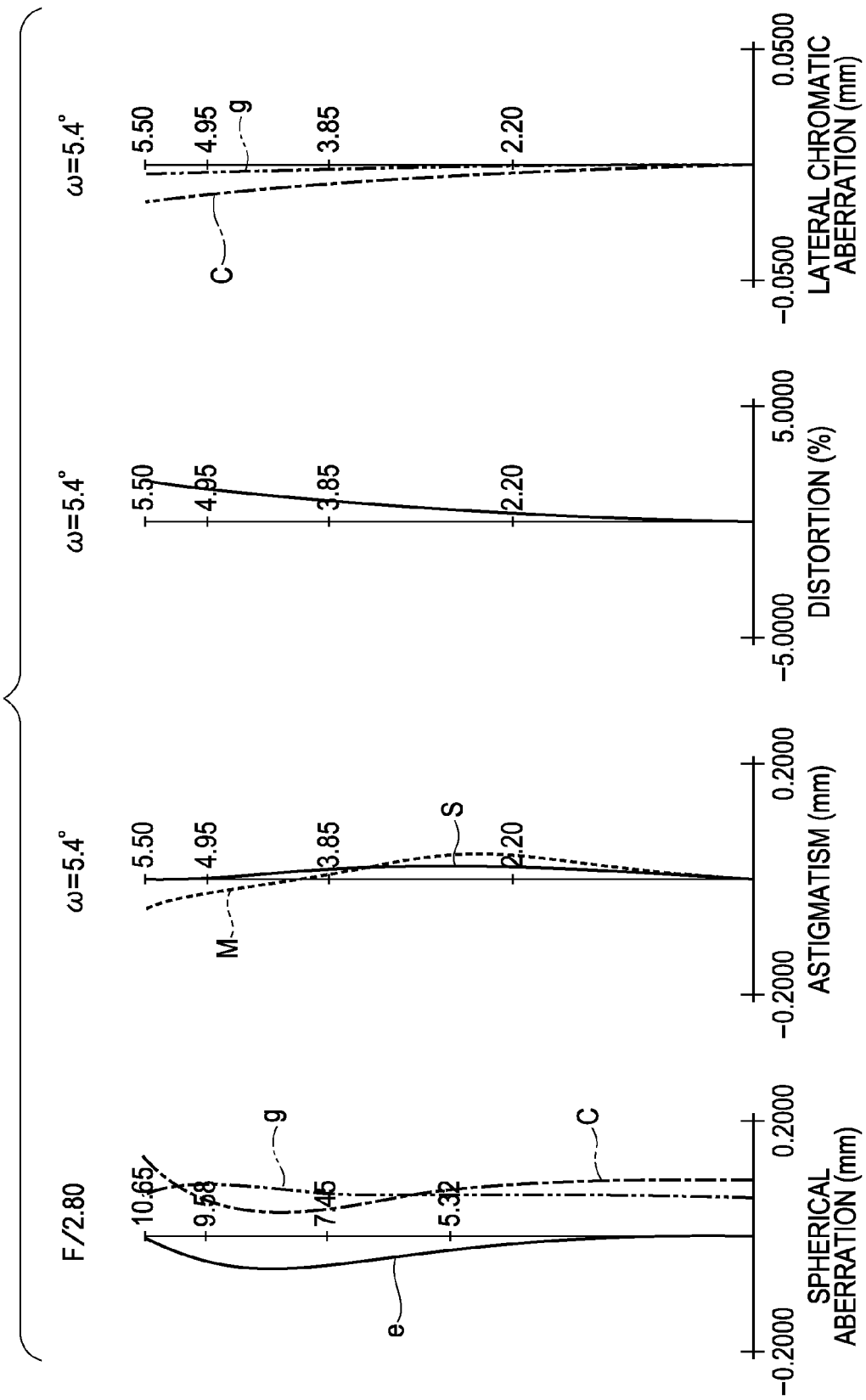
FIG. 10 includes aberration diagrams at a telephoto end in the second exemplary embodiment.

FIGS. 9 and 10 include aberration diagrams of the zoom lens of the second exemplary embodiment at the wide angle end and the telephoto end when an object at infinity is in focus.

Figure 11:
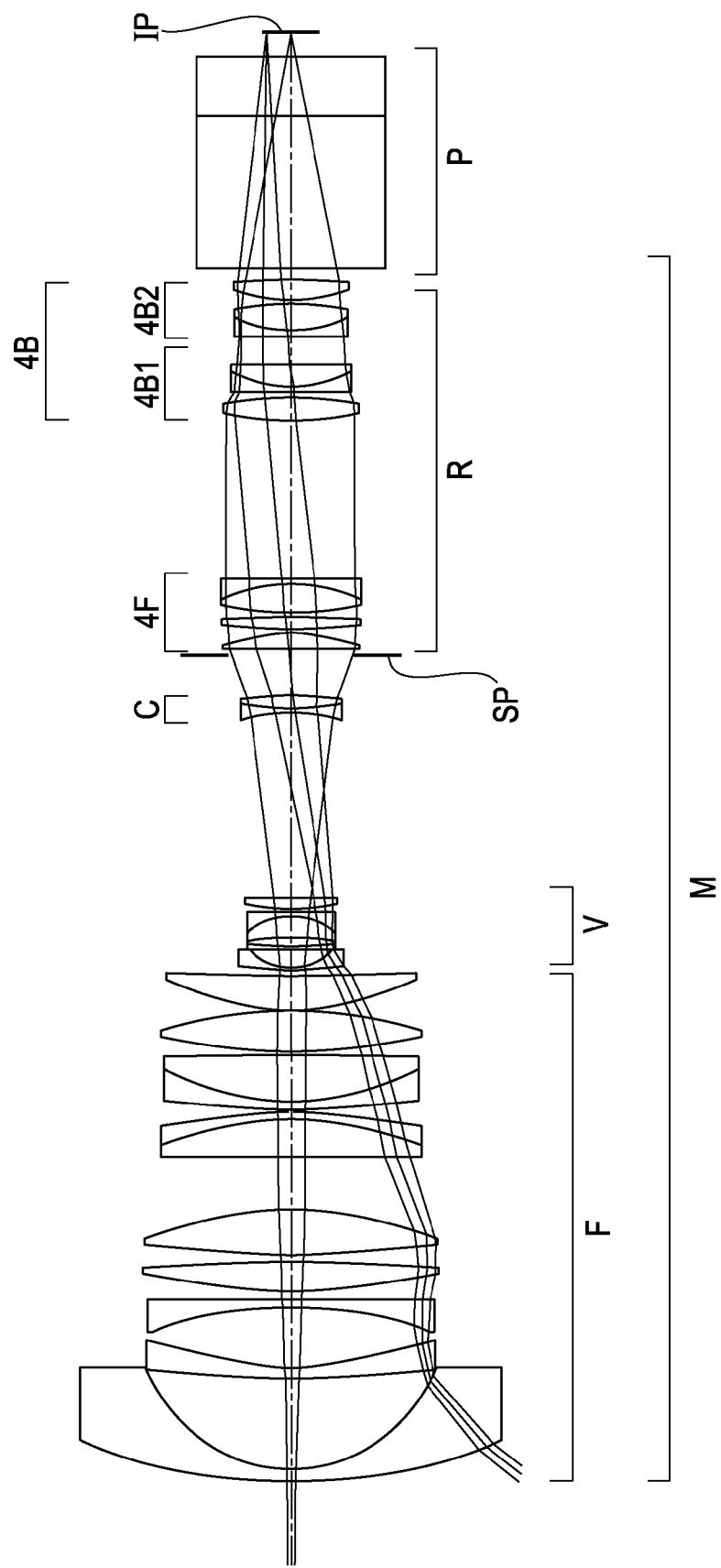
FIG. 11 is a cross-sectional view of a zoom lens at a wide angle end according to a third exemplary embodiment.

FIG. 11 is a cross-sectional view of a zoom lens at the wide angle end according to a third exemplary embodiment of the preset invention.

Figure 12:
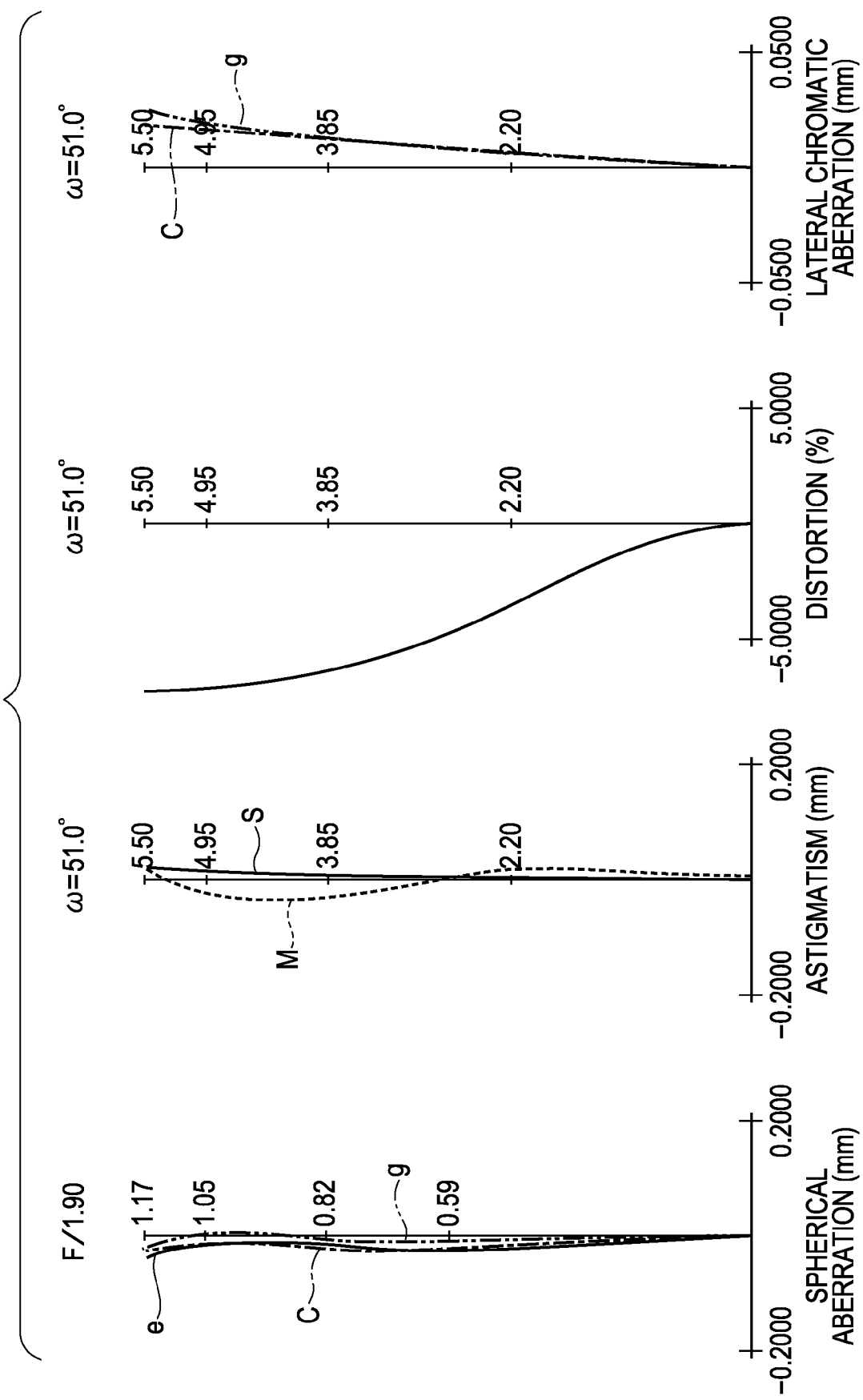
FIG. 12 includes aberration diagrams at the wide angle end in the third exemplary embodiment.
Figure 13:
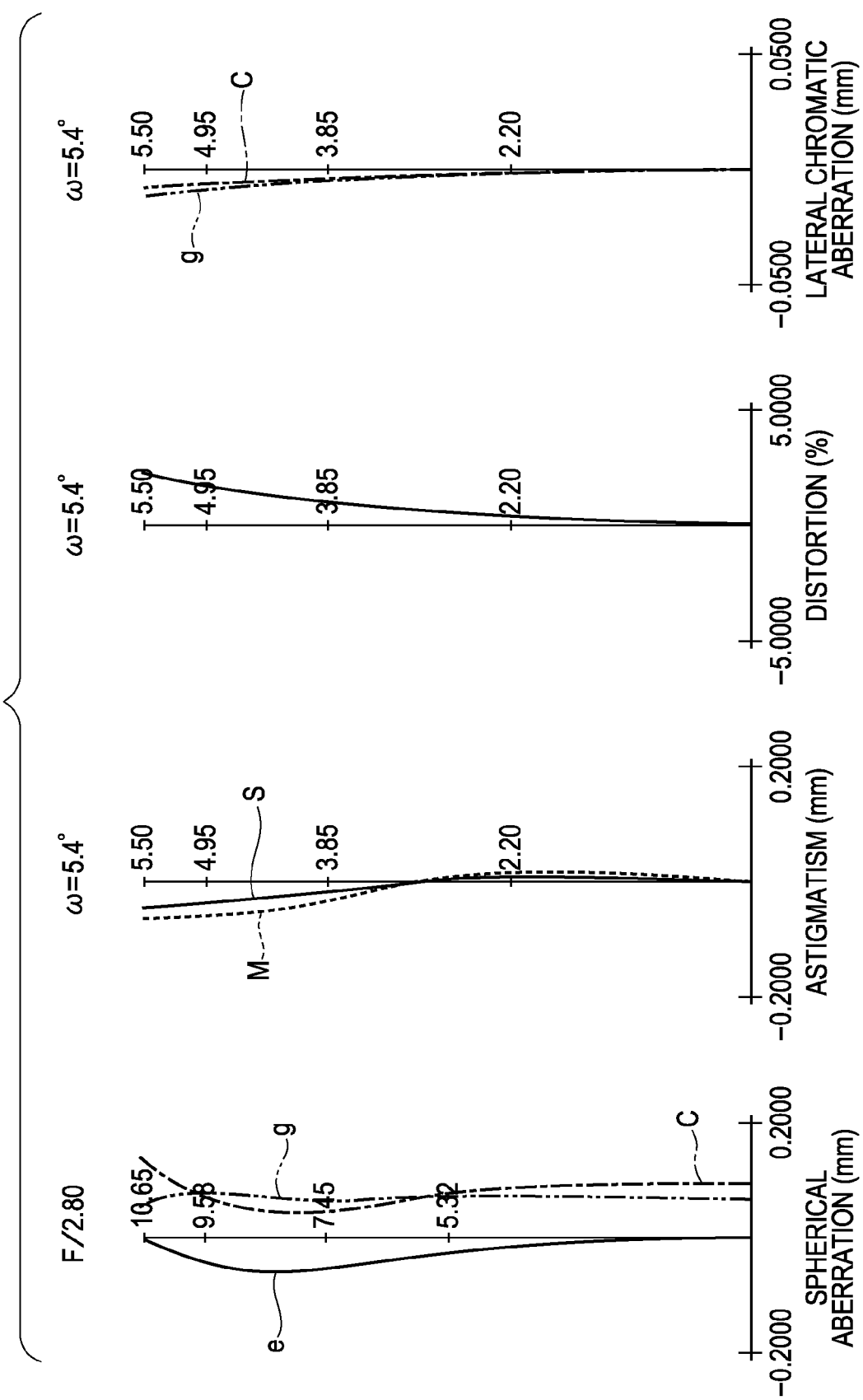
FIG. 13 includes aberration diagrams at a telephoto end in the third exemplary embodiment.

FIGS. 12 and 13 include aberration diagrams of the zoom lens of the third exemplary embodiment at the wide angle end and the telephoto end when an object at infinity is in focus.

Figure 14:
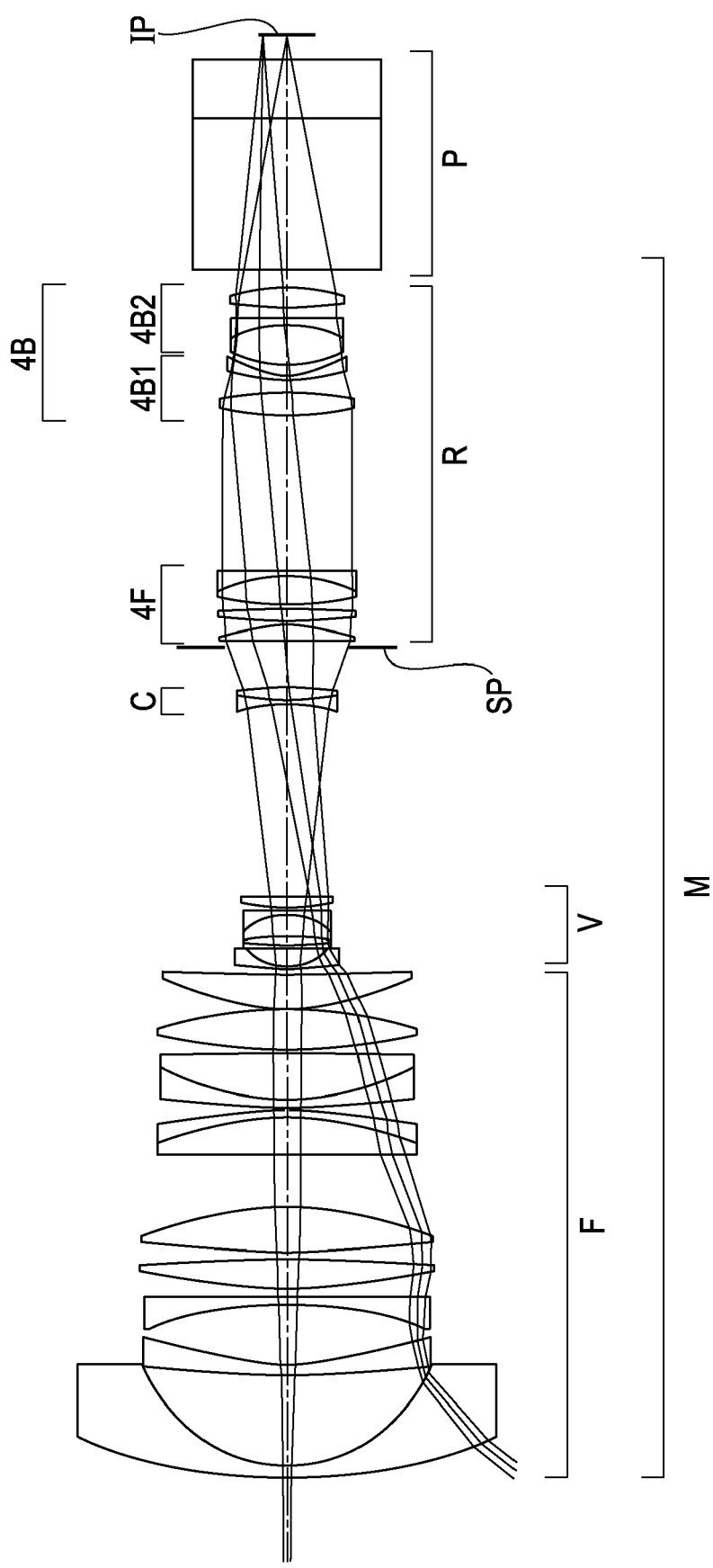
FIG. 14 is a cross-sectional view of a zoom lens at a wide angle end according to a fourth exemplary embodiment.

FIG. 14 is a cross-sectional view of a zoom lens at the wide angle end according to a fourth exemplary embodiment.

Figure 15:
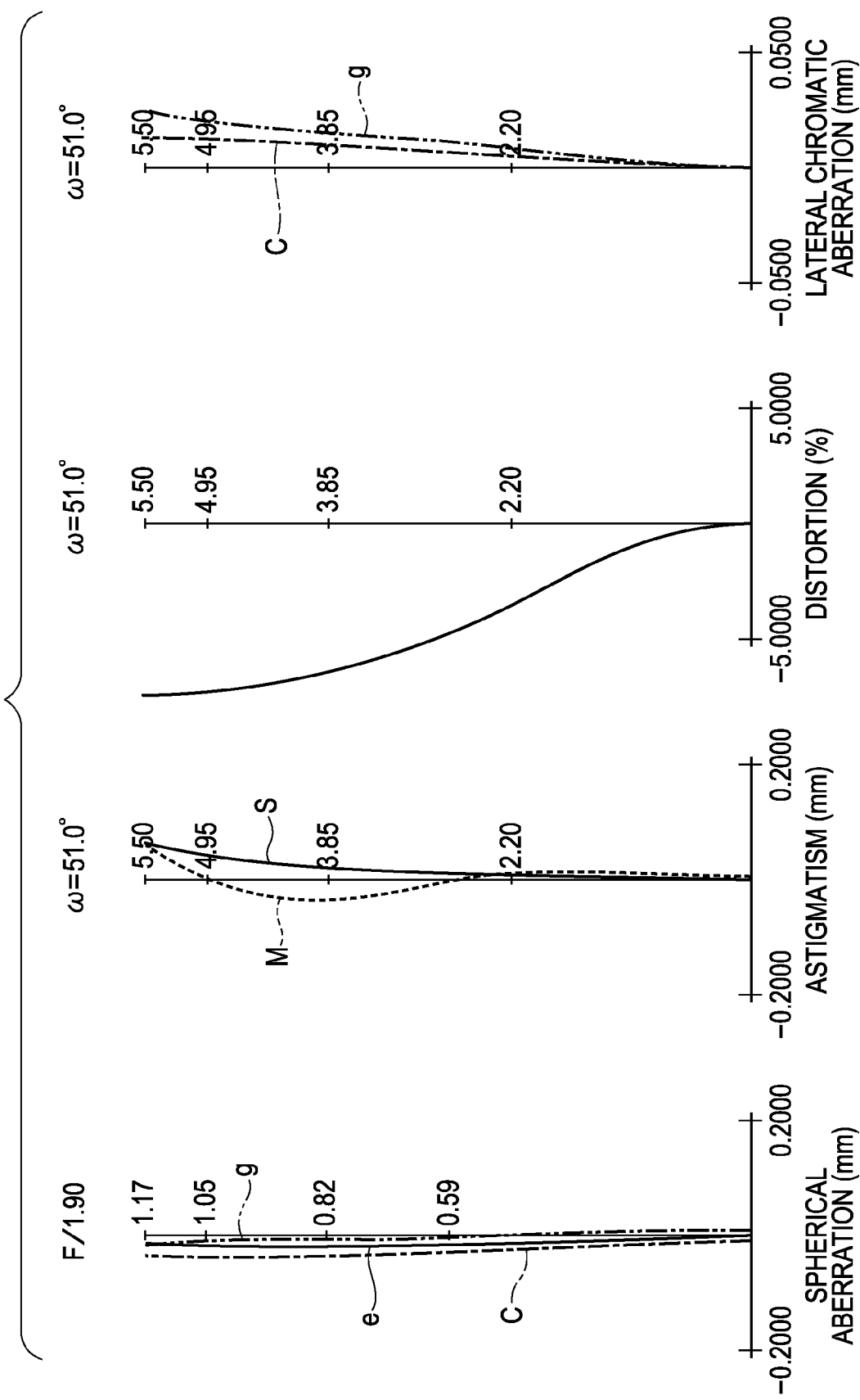
FIG. 15 includes aberration diagrams at the wide angle end in the fourth exemplary embodiment.
Figure 16:
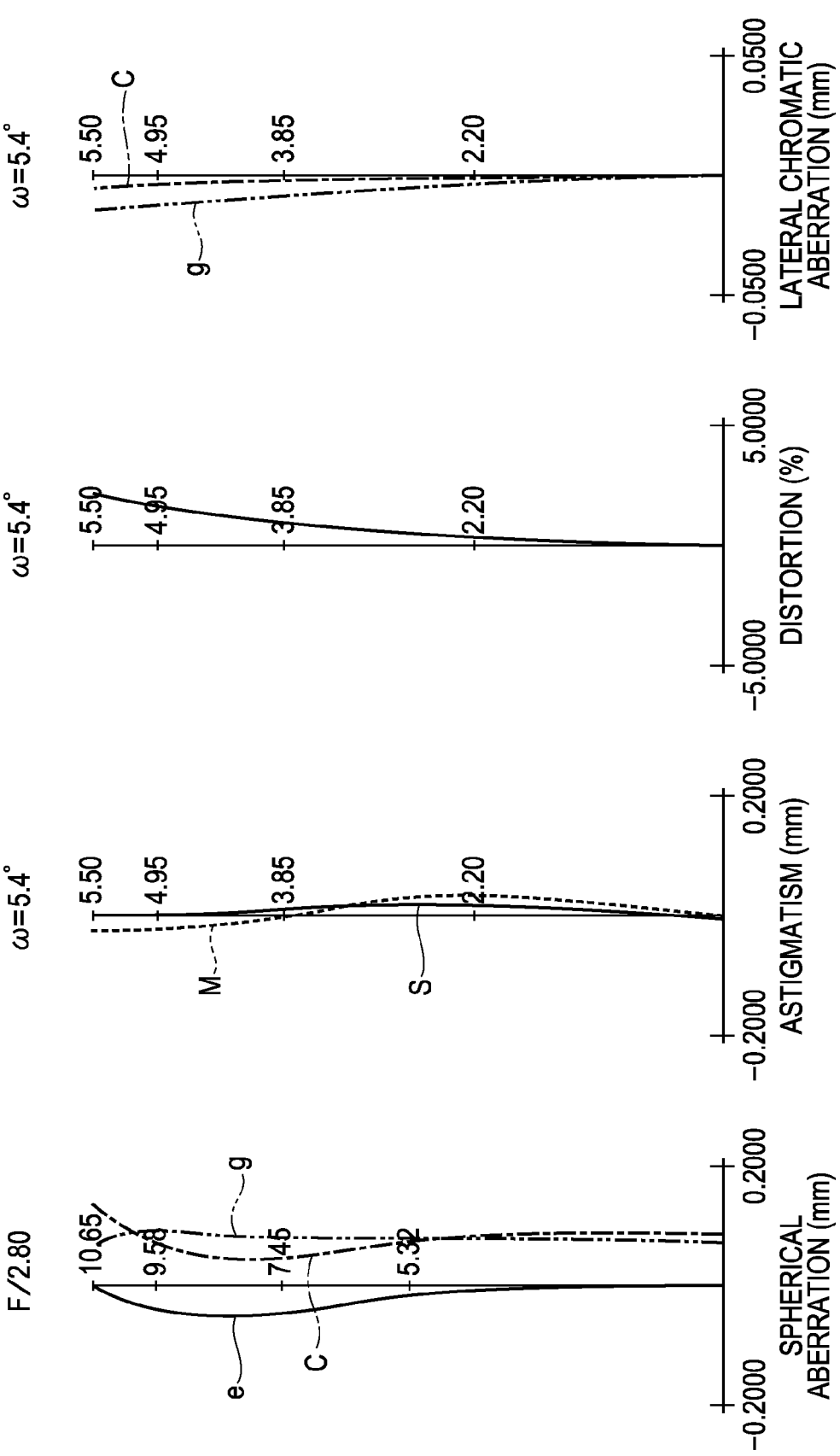
FIG. 16 includes aberration diagrams at a telephoto end in the fourth exemplary embodiment.

FIGS. 15 and 16 include aberration diagrams of the zoom lens at the wide angle end and the telephoto end when an object at infinity is in focus in the fourth exemplary embodiment.

Figure 17:
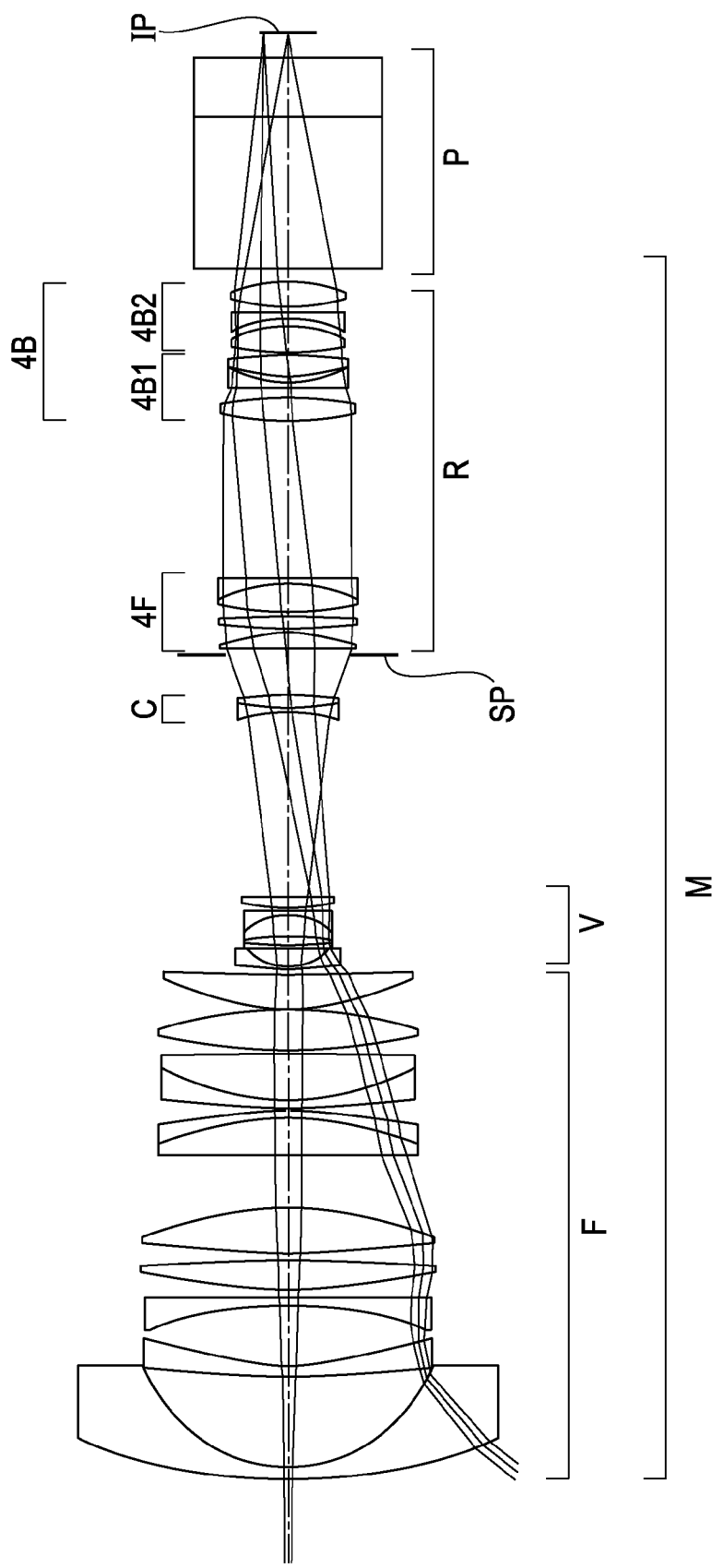
FIG. 17 is a cross-sectional view of a zoom lens at a wide angle end according to a fifth exemplary embodiment.

FIG. 17 is a cross-sectional view of a zoom lens at the wide angle end according to a fifth exemplary embodiment.

Figure 18:
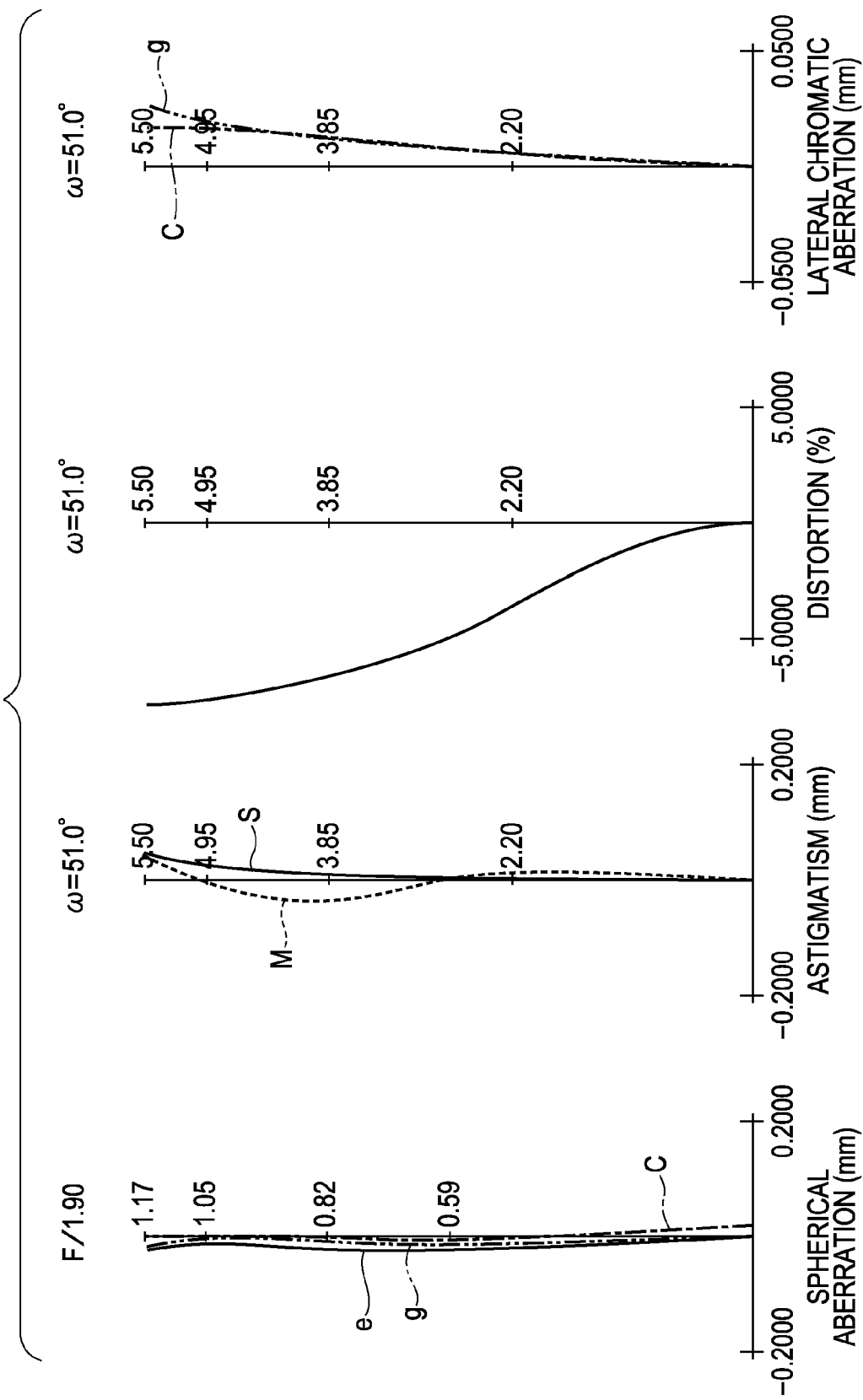
FIG. 18 includes aberration diagrams at the wide angle end in the fifth exemplary embodiment.
Figure 19:
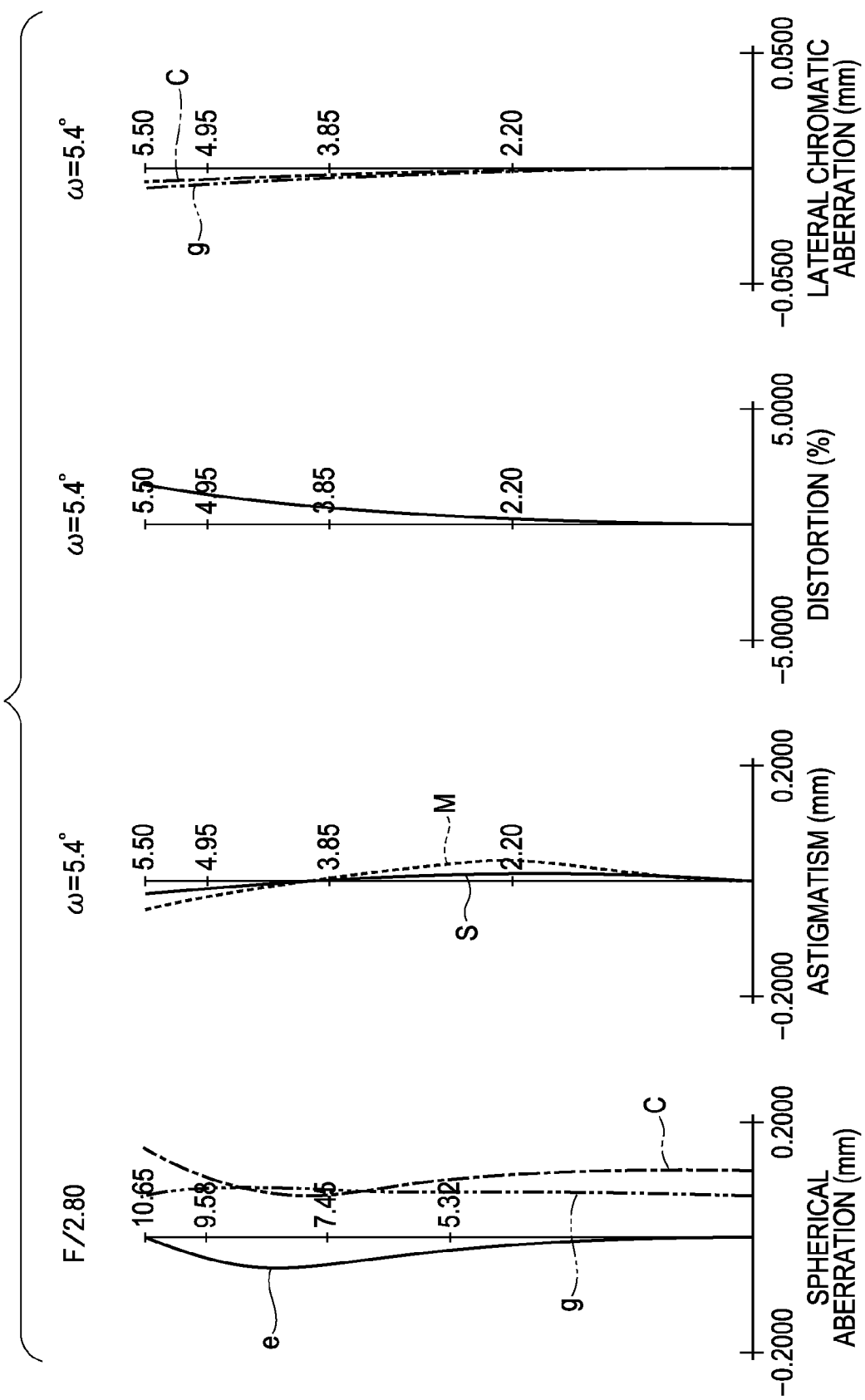
FIG. 19 includes aberration diagrams at a telephoto end in the fifth exemplary embodiment.

FIGS. 18 and 19 include aberration diagrams of the zoom lens at the wide angle end and the telephoto end when an object at infinity is in focus in the fifth exemplary embodiment.

Figure 20:
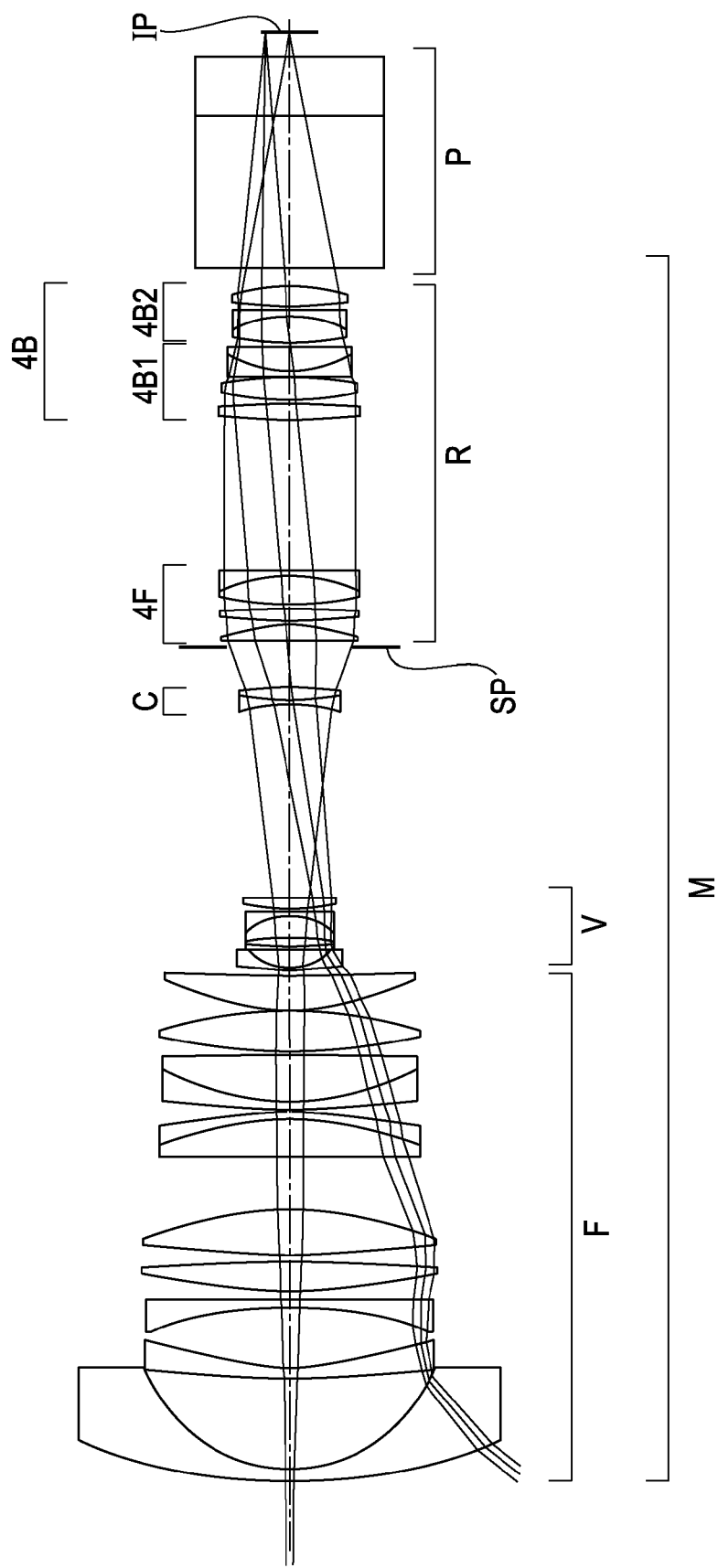
FIG. 20 is a cross-sectional view of a zoom lens at a wide angle end according to a sixth exemplary embodiment.

FIG. 20 is a cross-sectional view of a zoom lens at the wide angle end according to a sixth exemplary embodiment.

Figure 21:
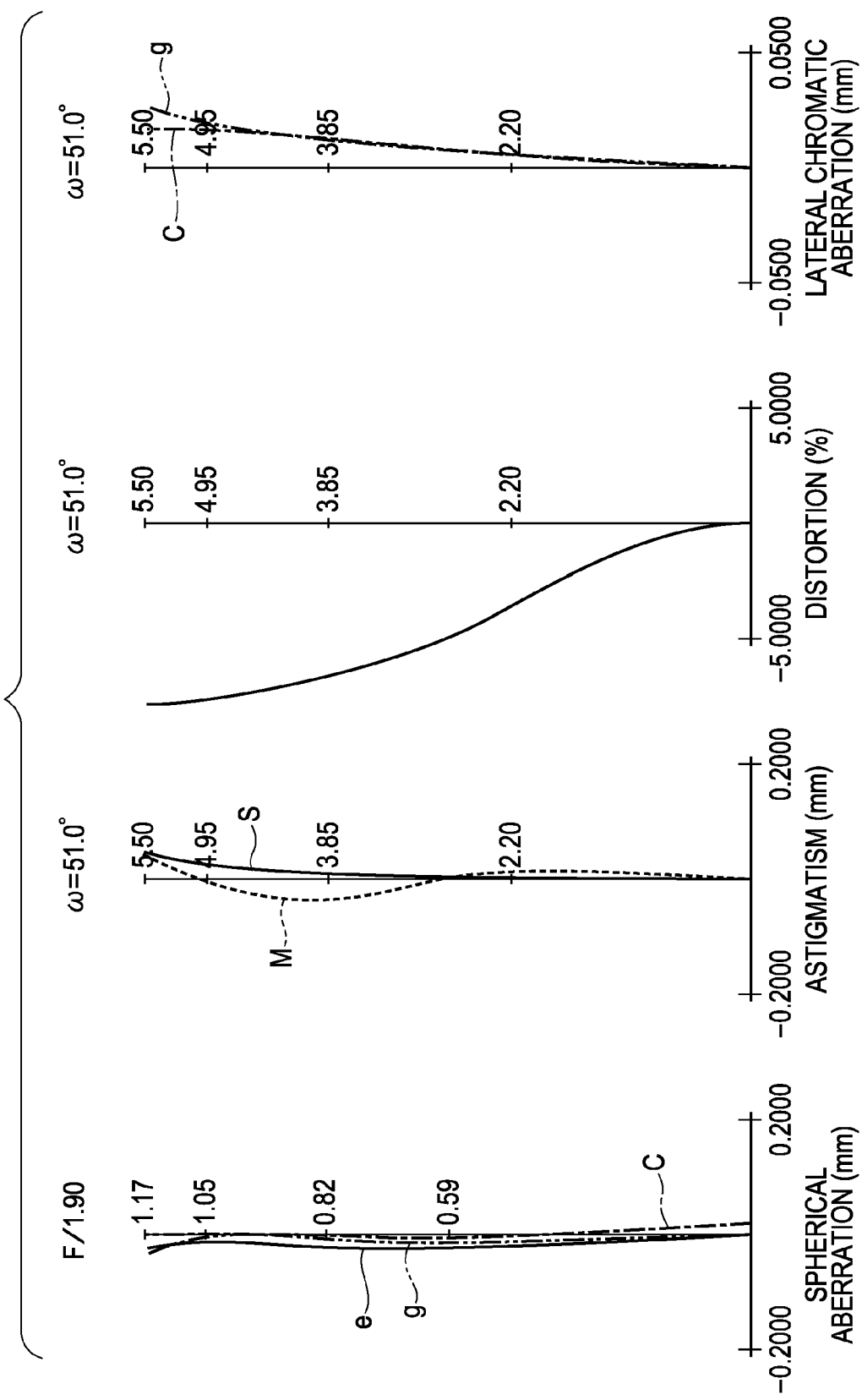
FIG. 21 includes aberration diagrams at the wide angle end in the sixth exemplary embodiment.
Figure 22:
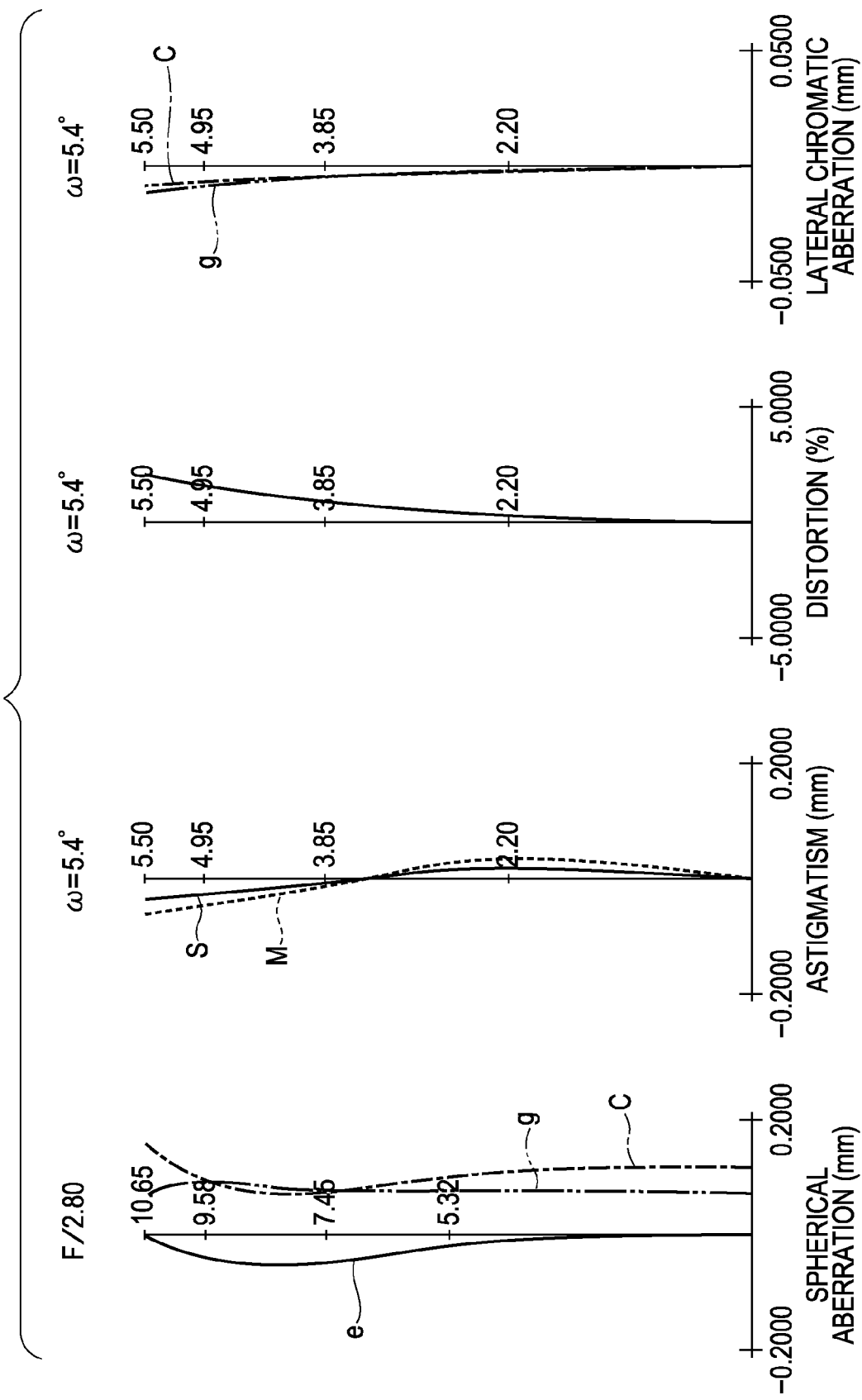
FIG. 22 includes aberration diagrams at a telephoto end in the sixth exemplary embodiment.

FIGS. 21 and 22 include aberration diagrams of the zoom lens at the wide angle end and the telephoto end when an object at infinity is in focus in the sixth exemplary embodiment.

Figure 23:
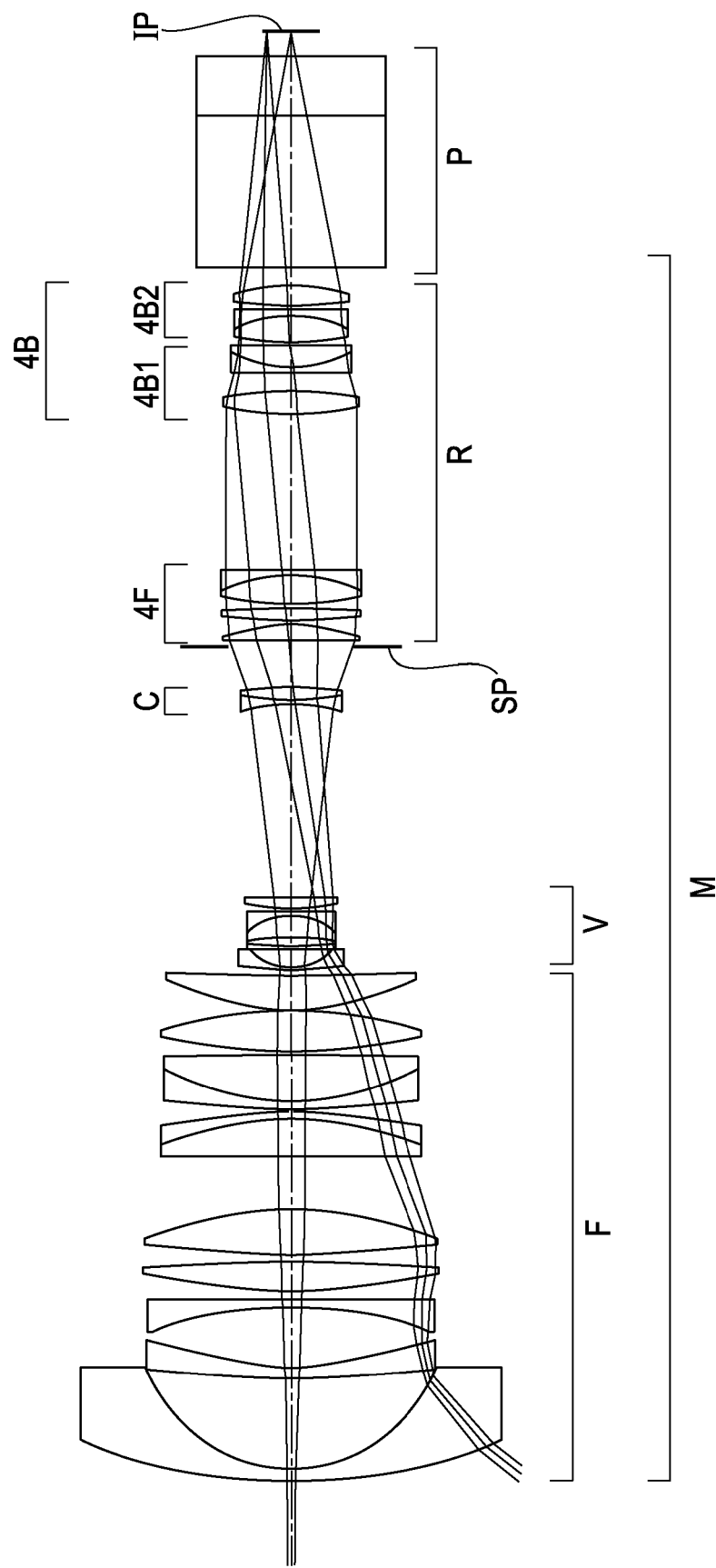
FIG. 23 is a cross-sectional view of a zoom lens at a wide angle end according to a seventh exemplary embodiment.

FIG. 23 is a cross-sectional view of a zoom lens at the wide angle end according to a seventh exemplary embodiment.

Figure 24:
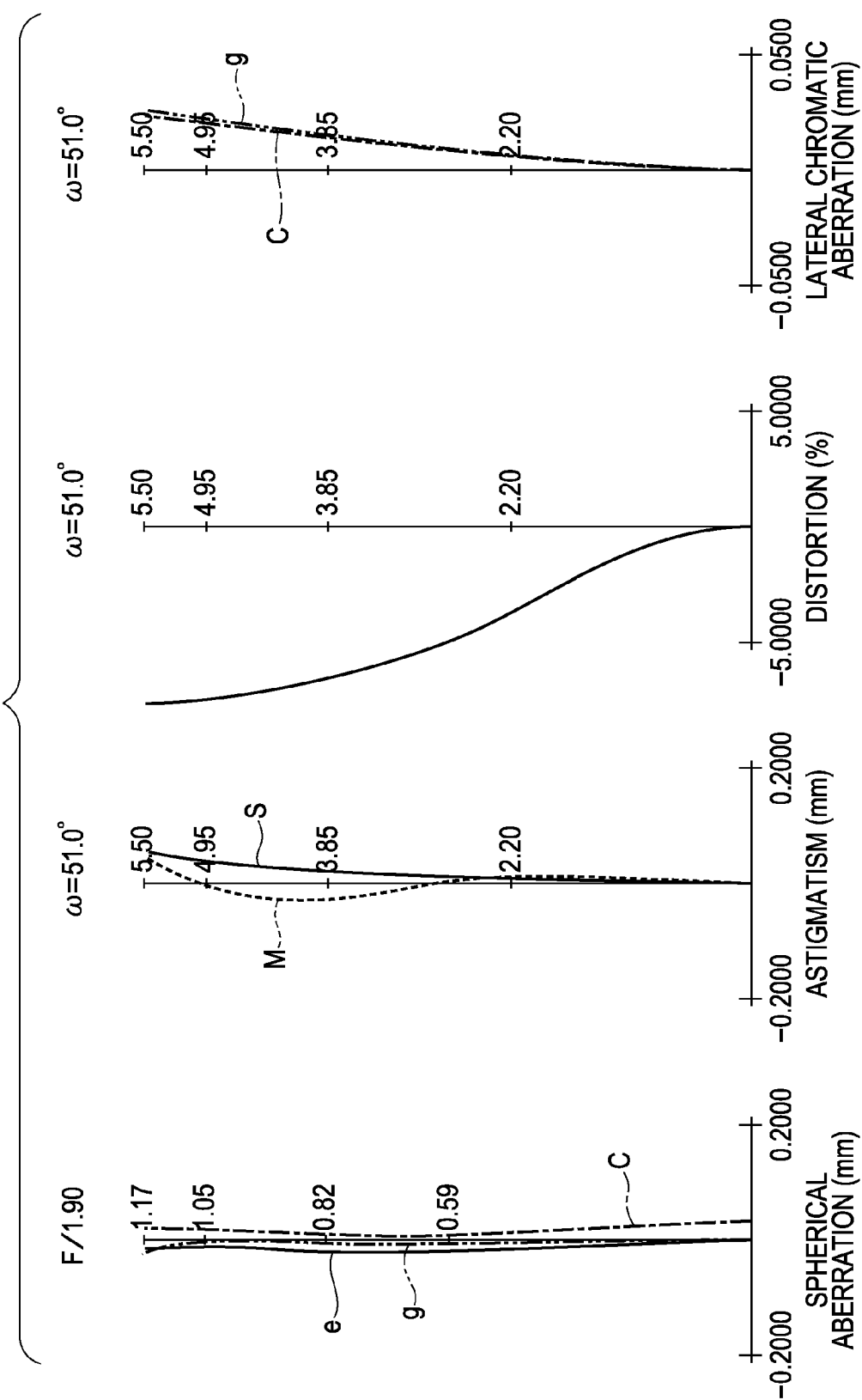
FIG. 24 includes aberration diagrams at the wide angle end in the seventh exemplary embodiment.
Figure 25:
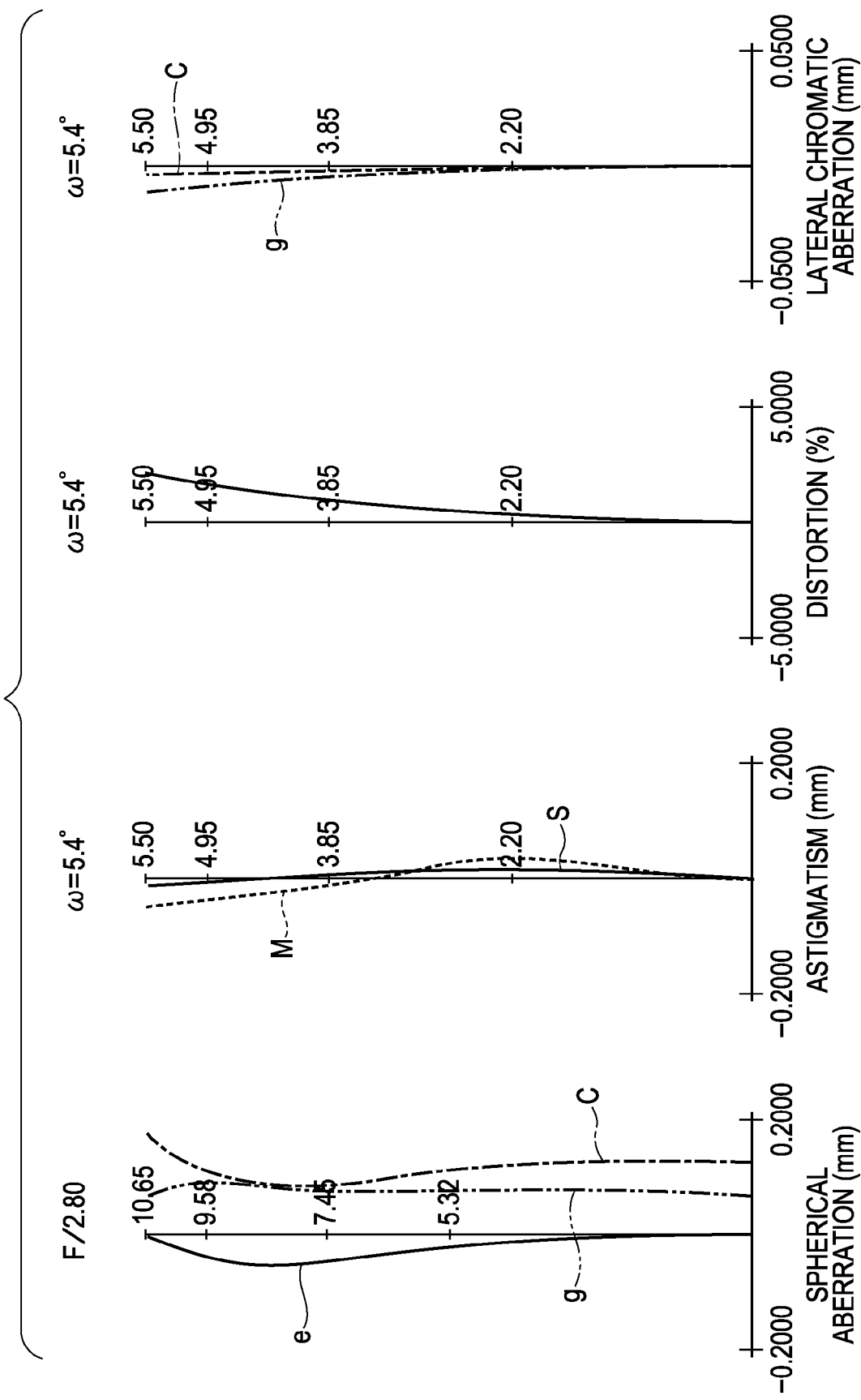
FIG. 25 includes aberration diagrams at a telephoto end in the seventh exemplary embodiment.

FIGS. 24 and 25 include aberration diagrams of the zoom lens at the wide angle end and the telephoto end when an object at infinity is in focus in the seventh exemplary embodiment.

Figure 26:
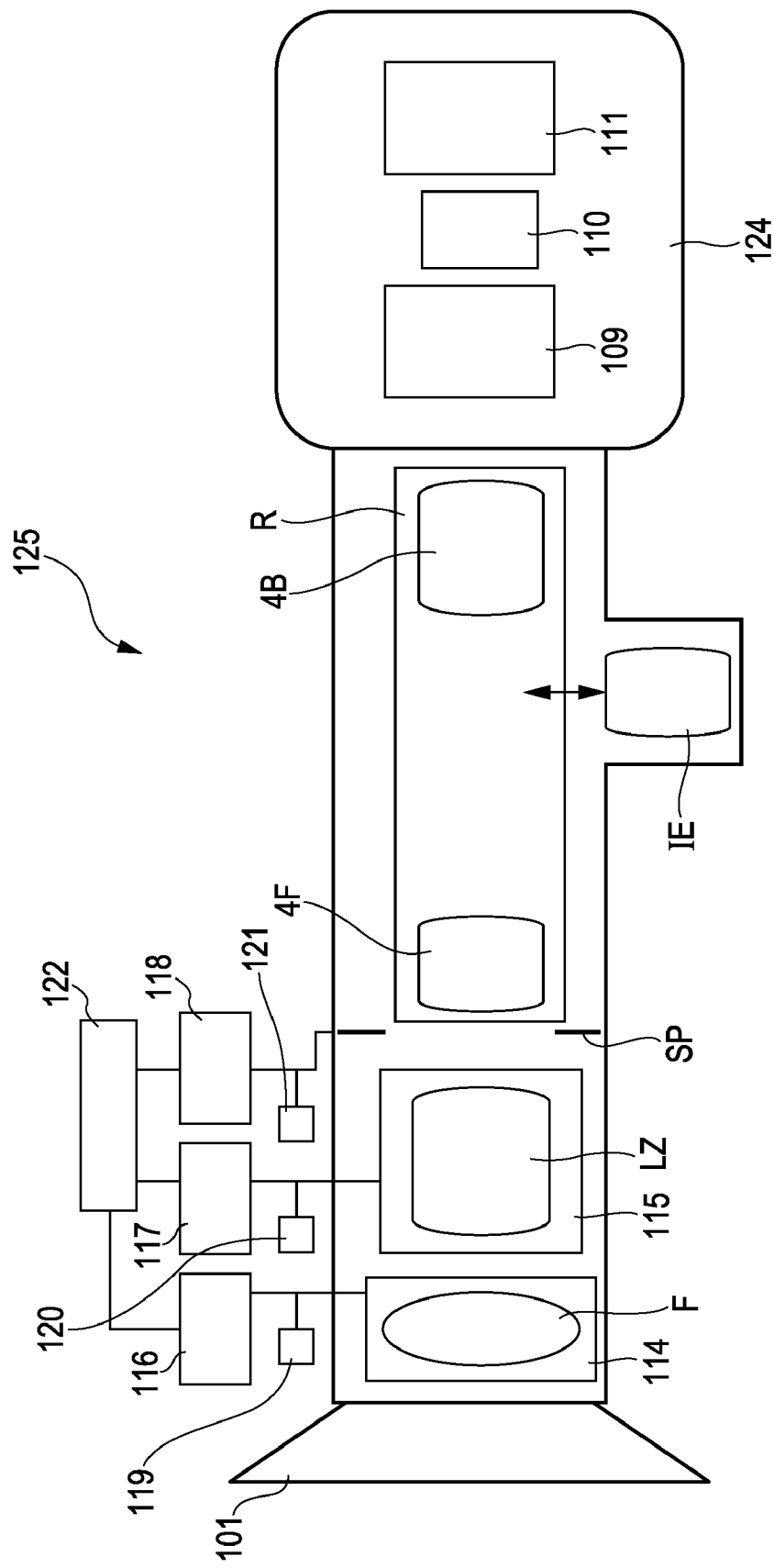
FIG. 26 is a schematic view showing the principal part of an image pickup apparatus according to the present invention.

FIG. 26 is a schematic view showing the principal part of an image pickup apparatus according to the present invention.

In the cross-sectional views of the lens, a first lens unit F has a positive refractive power, and does not move for zooming.

The first lens unit F is entirely or partly moved for focusing, but is not moved for zooming.

A second lens unit (variator lens unit) V has a negative refractive power and is movable for zooming.

The second lens unit V is moved monotonically along the optical axis toward the image plane so as to perform zooming from the wide angle end to the telephoto end.

A third lens unit (compensator lens unit) C has a positive or negative refractive power, and is movable during zooming so as to correct image plane variation due to zooming.

During zooming from the wide angle end to the telephoto end, at least part of the third lens unit C is moved (along a nonlinear path) so as to reduce (correct) image plane variation due to zooming. The second lens unit V and the third lens unit C constitute a zoom system (zoom unit).

An aperture stop SP is provided on an image side of the third lens unit C.

In the fourth lens unit R (relay lens unit) for imaging, a fourth-F lens unit (fourth-F unit) 4F is provided on the object side and a fourth-B lens unit (fourth-B unit) 4B is provided on the image side so that the longest air gap in the fourth lens unit R is provided therebetween. A lens unit (extender lens) 1E for shifting the focal length range of the entire lens system is removably inserted between the fourth-F unit 4F and the fourth-B unit 4B (in the optical path). The fourth-B lens unit 4B includes a fourth-B1 lens unit (fourth-B1 unit) 4B1 provided on the object side, and a fourth-B2 lens unit (fourth-B2 unit) 4B2 provided on the image side.

The center of the thickness of the fourth-B1 unit 4B1 is closer to the object side than the center of the total length of the fourth-B unit 4B (on the optical axis), and the center of the thickness of the fourth-B2 unit 4B2 is closer to the image side than the center of the total length. In other words, the center of the thickness of at least one lens included in the fourth-B1 unit 4B1 is closer to the object side than the center of the total length of the fourth-B unit 4B, and the center of the thickness of at least one lens included in the fourth-B2 unit 4B2 is closer to the image side than the center of the total length of the fourth-B unit 4B.

A glass block P includes a color separation prism or an optical filter. An image plane IP corresponds to an image pickup surface of a solid-state image pickup element (photoelectric conversion element) or a silver halide film.

In FIG. 1, h1, h2 respectively represent the incident heights at which an off-axis principal ray enters an object-side negative lens and an object-side positive lens in the first lens unit F at the wide angle end in the first exemplary embodiment.

In FIG. 2, h1 and h2 respectively represent the incident heights at which an axial marginal ray enters the object-side negative lens and the object-side positive lens in the first lens unit F at the telephoto end in the first exemplary embodiment.

In the aberration diagrams, spherical aberration is shown by a g-line, an e-line, and a C-line. M and S respectively represent a meridional image plane and a sagittal image plane. Lateral chromatic aberration is shown by the g-line and the C-line, F represents the f-number, and ω) represents the half field angle.

In the following exemplary embodiments, the wide angle end and the telephoto end refer to zoom positions where the second lens unit V for zooming is placed at either end of a mechanically movable range on the optical axis.

Characteristics of the exemplary embodiments will now be explained.

In general, in a four-unit zoom lens like the zoom lenses of the exemplary embodiments, when the angle of view (image-taking angle of view) at the wide angle end is 78° C. or more, the effective diameter of the first lens unit increases, and the size of the first lens unit also increases. In order to reduce the size of the first lens unit, it is necessary to reduce the focal length of the first lens unit.

It is also necessary to ensure a long back focus of the first lens unit in order to reduce the distance between the principal point of the first lens unit and the principal point of the second lens unit at the wide angle end.

Therefore, it is effective for size reduction to form the first lens unit as a retrofocus type in which a lens unit having a negative refractive power is provided on the object side and a lens unit having a positive refractive power is provided on the image side, as shown in FIG. 1.

In order to increase the angle of view, it is necessary to further increase the back focus of the first lens unit. This increases the retro ratio of the first lens unit, and increases the refractive power of the object-side negative lens in the first lens unit.

When the refractive power of the object-side negative lens in the first lens unit increases, the tendency of the incident heights h1 and h2 of the axial marginal ray in FIG. 2 to have the following relationship increases:

$$h1 < h2.$$

In general, as the above-described tendency increases, the refractive power of the object-side positive lens decreases, to provide a correction condition for proper correction of lateral chromatic aberration.

At the wide angle end, the incident heights h1, h2 at which the off-axis principal ray enters the negative lens and the positive lens on the object side in the first lens unit are large, as shown in FIG. 1.

For this reason, as the refractive power of the negative lens increases and the refractive power of the positive lens decreases, correction of lateral chromatic aberration becomes insufficient at the wide angle end, and it is difficult to properly correct chromatic aberration.

Insufficient correction of lateral chromatic aberration means that the image height of light having a wavelength shorter than the reference wavelength is smaller than the image height of light having the reference wavelength.

Excessive correction of lateral chromatic aberration means that the image height of light having a wavelength shorter than the reference wavelength is larger than the image height of light having the reference wavelength.

Insufficient correction of longitudinal chromatic aberration means that the imaging position of light having a wavelength shorter than the reference wavelength is closer to the object side than that of light having the reference wavelength. Excessive correction of longitudinal chromatic aberration means that the imaging position of light having a wavelength shorter than the reference wavelength is closer to the image side than that of light having the reference wavelength.

Accordingly, in the exemplary embodiments, chromatic aberration caused when the first lens unit F is formed of a retrofocus lens is suppressed by properly setting the lens layout of the fourth-B lens unit 4B in the fourth lens unit R.

In the exemplary embodiments, the fourth-B unit 4B includes two negative lenses and at least three positive lenses. In other words, two negative lenses and at least three positive lenses are lenses that constitute the fourth-B unit 4B (optical elements having optical power), and the fourth-B unit 4B may include other optical elements having no optical power, such as an aperture stop and an optical filter.

Each of the fourth-B1 unit 4B1 and the fourth-B2 unit 4B2 includes one negative lens and at least one positive lens.

The average Abbe numbers of the materials of the positive lens in the fourth-B1 unit 4B1 and the positive lens in the fourth-B2 unit 4B2 are designated as ν1p and ν2p respectively. When each unit includes only one positive lens, the Abbe number of the material of the positive lens is used.

In this case, the following conditions are satisfied:

$$0.50 < \nu 1p/\nu 1n < 1.10 \tag{1}$$

$$2.30 < \nu 2p/\nu 2n \tag{2}$$

where ν1n and ν2n respectively represent an average of Abbe numbers of the materials of the negative lenses included in the fourth-B1 unit 4B1 and the fourth-B2 unit 4B2 respectively. In the above conditional expressions, when each unit includes a plurality of negative lenses, an average of Abbe numbers of the materials of the negative lenses is used, as described above. In contrast, when each unit includes only one negative lens, the Abbe number of the material of the negative lens is used.

By satisfying the above Conditional Expressions 1 and 2, lateral chromatic aberration at the wide angle end is properly corrected, and optical performance of the zoom lens is improved.

Conditional Expressions 1 and 2 specify dispersions of the materials of the positive and negative lenses in the fourth-B1 unit 4B1.

The fourth-B1 unit 4B1 on the object side and the fourth-B2 unit 4B2 on the image side are different in the incident height h of the axial marginal ray and the incident height h of the off-axis principal ray.

By properly setting the ratio of the Abbe numbers of the positive and negative lenses in the fourth-B1 unit 4B1 and the fourth-B2 unit 4B2 while using the difference, lateral chromatic aberration at the wide angle end is properly corrected without disturbing the performance balance of longitudinal chromatic aberration.

When the value is less than the lower limit in Conditional Expression 1, the dispersion of the material of the positive lens is too large and the dispersion of the material of the negative lens is too small in the fourth-B1 unit 4B1. For this reason, when lateral chromatic aberration is corrected, the power of the negative lens in the fourth-B2 unit 4B2 increases, high-order aberration increases, and optical performance deteriorates.

When the value is more than the upper limit in Conditional Expression 1, the dispersion of the material of the positive lens is too small and the dispersion of the material of the negative lens is too large in the fourth-B1 unit 4B1. For this reason, it is difficult to properly correct both longitudinal chromatic aberration and lateral chromatic aberration. In particular, correction of lateral chromatic aberration is insufficient, and optical performance deteriorates.

When the value is less than the lower limit in Conditional Expression 2, the dispersion of the material of the positive lens is too large and the dispersion of the material of the negative lens is too small in the fourth-B2 unit 4B2. For this reason, it is difficult to properly correct both longitudinal chromatic aberration and lateral chromatic aberration. In particular, correction of lateral chromatic aberration is insufficient, and optical performance deteriorates.

In the exemplary embodiments, it is preferable to set the numerical values in Conditional Expressions 1 and 2 within the following ranges:

$$0.52 < \nu 1p/\nu 1n < 1.00 \tag{1a}$$

$$2.35 < \nu 2p/\nu 2n \tag{2a}$$

It is more preferable that ν2p/ν2n in Conditional Expression 2 is smaller than 5.00 (even more preferably, smaller than 3.00).

In the exemplary embodiments, the lens layout and the Abbe numbers of the materials of the fourth-B unit 4B provided on the image side in the fourth lens unit R are properly set, as described above. Accordingly, aberration, in particular, lateral chromatic aberration at the wide angle end is properly corrected, and a zoom lens having high optical performance, a wide angle of view, a high zoom ratio, and a high aperture ratio is realized.

It is more preferable to satisfy at least one of the following Conditional Expressions 3 to 7 (of course, these conditional expressions are not essential for the present invention). By satisfying the conditional expressions, advantages corresponding to the conditional expressions are obtained.

At least one of the following conditions is satisfied:

$$\theta 2n + 0.00162 \times \nu 2n < 0.670 \tag{3}$$

$$(\theta 2n - \theta 2p)/(\nu 2p - \nu 2n) < 0.0023 \tag{4}$$

where ν2p and θ2p respectively represent the average Abbe number and the average partial dispersion ratio of the materials of the positive lenses in the fourth-B2 unit 4B2, and ν2n and θ2n respectively represent the Abbe number and the partial dispersion ratio of the material of the negative lens in the fourth-B2 unit 4B2.

The Abbe number and partial dispersion ratio of the optical members used in the exemplary embodiments are as follows.

The Abbe number νd and the partial dispersion ratio θgd are defined in the same manner as the general manner, and are given as follows:

$$\nu d = (Nd - 1)/(NF - NC)$$

$$\theta gd = (Ng - Nd)/(NF - NC)$$

where Ng, NF, Nd, and NC respectively represent the refractive indices for a g-line, an F-line, a d-line, and a C-line of Fraunhofer lines.

Conditional Expressions 3 and 4 specify the dispersion and partial dispersion ratio of the materials of the positive lens and the negative lens in the fourth-B2 unit 4B2.

In the exemplary embodiments, in the fourth-B2 unit 4B2 in which the incident height h of the off-axis principal ray is large in the fourth-B unit 4B, the inclination of the difference in partial dispersion ratio between the positive lens and the negative lens with respect to the difference in dispersion between the positive lens and the negative lens is set appropriately.

This allows a secondary spectrum of lateral chromatic aberration to be properly corrected at the wide angle end.

When the values are out of the ranges specified in Conditional Expressions 3 and 4, proper correction is difficult at both short-wavelength and long-wavelength sides of lateral chromatic aberration, and the secondary spectrum deteriorates.

It is preferable to set the numerical values in Conditional Expressions 3 and 4 within the following ranges:

$$\theta 2n + 0.00162 \times \nu 2n < 0.660 \tag{3a}$$

$$(\theta 2n - \theta 2p)/(\nu 2p - \nu 2n) < 0.0022 \tag{4a}$$

It is more preferable to set the numerical values within the following ranges:

$$\theta 2n + 0.00162 \times \nu 2n < 0.645 \tag{3b}$$

$$(\theta 2n - \theta 2p)/(\nu 2p - \nu 2n) < 0.0017 \tag{4b}$$

It is preferable that θ2n+0.00162×ν2n in Conditional Expression 3 be more than 0.400 (more preferably, more than 0.550).

It is preferable that (θ2n−θ2p)/(ν2p−ν2n) in Conditional Expression 4 be more than 0.00100 (more preferably, more than 0.00128).

Further, it is preferable to satisfy the following conditions:

$$-1.1 < f1p/f1n < -0.3 \quad (5)$$

$$-1.3 < f2p/f2n < -0.5 \quad (6)$$

where f1p and f2p represent the combined focal lengths of the positive lenses in the fourth-B1 unit 4B1 and the fourth-B2 unit 4B2, and f1n and f2n represent the focal lengths of the negative lenses in the fourth-B1 unit 4B1 and the fourth-B2 unit 4B2. Herein, a combined focal length fx of a plurality of lenses is expressed as follows when f1, f2, f3, . . . represent the focal lengths of the lenses:

$$1/fx = 1/f1 + 1/f2 + 1/f3 + \ldots$$

When at least one of (preferably, both of) Conditional Expressions 5 and 6 is satisfied, it is possible to provide a zoom lens that efficiently reduces (corrects) aberration (particularly lateral chromatic aberration at the wide angle end) and that has high optical performance (wide angle of view, high zoom ratio, and high aperture ratio).

Preferably, the numerical values in Conditional Expressions 5 and 6 are within the following ranges:

$$-0.950 < f1p/f1n < -0.460 \quad (5a)$$

$$-1.15 < f2p/f2n < -0.65 \quad (6a)$$

More preferably, the numerical values are within the following ranges:

$$-0.920 < f1p/f1n < -0.480 \quad (5b)$$

$$-1.07 < f2p/f2n < -0.70 \quad (6b)$$

Further, it is preferable to satisfy the following condition:

$$0.32 < fw/IS < 0.47 \quad (7)$$

where IS represents the image size (diagonal length) of an effective region (a region actually used for image taking) of a solid-state image pickup element (details will be described below) for receiving a subject image formed by the zoom lens, and fw represents the focal length of the entire zoom lens system at the wide angle end.

When the value is out of this range, it is difficult to reduce distortion (particularly negative distortion at the wide angle end) when image taking is performed at a wide angle of view.

It is more preferable that the numerical range in Conditional Expression 7 satisfy the following condition:

$$0.38 < fw/IS < 0.42 \quad (7a)$$

In the exemplary embodiments, the lens unit (extender lens) IE for shifting the focal length range of the entire lens system is detachably provided between the fourth-F unit 4F and the fourth-B unit 4B in the fourth lens unit R.

At the wide angle end of the four-unit zoom lens, excessive correction of longitudinal chromatic aberration of a short wavelength caused in the fourth-B unit 4B is cancelled by insufficient correction of longitudinal chromatic aberration of a short wavelength caused in the fourth-F unit 4F. When the zoom lens includes the lens unit IE, it is necessary to take consideration of aberration caused when the lens unit IE is inserted. For this reason, it is undesirable to increase the amount of aberration caused in the lens closer to the object side than the lens unit IE, where aberration is increased or decreased by insertion of the lens unit IE. Therefore, it is necessary to reduce the amount of longitudinal chromatic aberration in the fourth-F unit 4F and the fourth-B unit 4B.

When the zoom lens includes the lens unit IE, it is preferable that the angle of view increase, and that lateral chromatic aberration be excessively corrected and longitudinal chromatic aberration of a short wavelength be not corrected more than a predetermined level in the fourth-4B unit 4B.

Accordingly, lateral chromatic aberration is more effectively corrected by forming the fourth-B unit 4B so as to satisfy Conditional Expressions 1 to 4 described above in the zoom lens including the lens unit IE.

It is preferable that the configuration of the fourth-B unit 4B (layout of the lenses having refractive power in the fourth-B unit 4B) satisfy any of the following conditions:

(a) A positive lens, a cemented lens of a positive lens and a negative lens (regardless of order), a cemented lens of a positive lens and a negative lens (regardless of order), and a positive lens are arranged in that order from the object side to the image side;

(b) A positive lens, a cemented lens of a negative lens and a positive lens arranged in that order from the object side to the image side, a cemented lens of a positive lens and a negative lens arranged in that order from the object side to the image side, and a positive lens are arranged;

(c) A positive lens, a cemented lens of a positive lens and a negative lens arranged in that order from the object side to the image side, a cemented lens of a positive lens and a negative lens arranged in that order from the object side to the image side, and a positive lens are arranged;

(d) A positive lens, a cemented lens of a negative lens and a positive lens arranged in that order from the object side to the image side, a cemented lens of a negative lens and a positive lens arranged in that order from the object side to the image side, and a positive lens are arranged;

(e) A positive lens, a negative lens, a cemented lens of a positive lens and a negative lens arranged in that order from the object side to the image side, and a positive lens are arranged;

(f) A positive lens, a negative lens, a positive lens, a positive lens, a negative lens, and a positive lens are arranged; and (g) A positive lens, a positive lens, a cemented lens of a negative lens and a positive lens arranged in that order from the object side to the image side, a cemented lens of a positive lens and a negative lens arranged in that order from the object side to the image side, and a positive lens are arranged.

The fourth-B unit 4B has the above-described configuration, and satisfies Conditional Expressions 1 to 4. Consequently, the size of the lens is reduced, and aberrations, such as lateral chromatic aberration, spherical aberration, coma aberration, astigmatism, curvature of field, and longitudinal chromatic aberration, are corrected properly.

In the exemplary embodiments, a positive lens, a positive lens, and a cemented lens of a positive lens and a negative lens are arranged in that order from the object side to the image side in the fourth-F unit 4F. This achieves high optical performance over the entire zoom range.

FIG. 26 is a schematic view showing the principal part of an image pickup apparatus (television camera system) using a zoom lens according to any of the exemplary embodiments as an image taking optical system. In FIG. 26, reference numeral 101 denotes a zoom lens according to any one of the first to seventh exemplary embodiments. The zoom lens 101 is removably attached to a camera 124. By attaching the zoom lens 101 to the camera 124, an image pickup apparatus 125 is formed.

The zoom lens 101 includes a first lens unit F, a zoom unit LZ, and a fourth lens unit R for imaging. The first lens unit F includes a focus lens unit. The zoom unit LZ includes a second lens unit V that moves on the optical axis for zooming, and a third lens unit C that moves on the optical axis so as to correct image plane variation due to zooming.

SP represents an aperture stop. The fourth lens unit R includes a fourth-F unit 4F, a lens unit IE that can be inserted into and removed from the optical path, and a fourth-B unit 4B.

The lens unit IE shifts the focal length range of the entire system of the zoom lens 101.

Driving mechanisms 114 and 115, such as a helicoid and a cam, respectively drive the first lens unit F and the zoom unit LZ along the optical axis.

Motors (driving units) 116, 117 and 118 electrically drive the driving mechanisms 114 and 115 and the aperture stop SP.

Detectors 119, 120 and 121, such as an encoder, a potentiometer, or a photosensor, detect the positions of the first lens unit F and the zoom unit LA on the optical axis, and the stop diameter of the aperture stop SP.

In the camera 124, a glass block 109 corresponds to an optical filter or a color separation prism, and a solid-state image pickup element (photoelectric conversion element) 110, such as a CCD sensor or a CMOS sensor, receives a subject image formed by the zoom lens 101.

CPUs 111 and 122 control various driving operations of the camera 124 and the zoom lens 101.

By thus applying the zoom lens of the present invention to a television camera, an image pickup apparatus having high optical performance is realized.

First to seventh numerical examples corresponding to the above-described first to seventh exemplary embodiments will now be described. In the numerical examples, i represents the order number of the lens surface from the object side, ri represents the radius of curvature of the i-th lens surface, di represents the distance between the i-th lens surface and the i+1-th lens surface, and Ni and vi respectively represent the refractive index and Abbe number of the i-th optical member. Further, f, Fno, 2ω respectively represent the focal length, the f-number, and the angle of view of the entire system when an object at infinity is in focus. Bf represents the back focus, and Y represents the image height.

The last three surfaces are formed of glass blocks such as a face plate.

The aspherical shape is given by the following expression:

$$X = \frac{H^2/R}{1+\sqrt{1-(1+k)(H/R)^2}} + BH^4 + CH^6 + DH^8 + EH^{10} + A'H^3 + B'H^5 + C'H^7 + D'H^9$$

where the X-axis indicates the optical axis direction, the H-axis indicates the direction perpendicular to the optical axis, the light traveling direction is a positive direction, R represents the paraxial radius of curvature, k is a conic constant, and B, C, D, E, A', B', C', and D' are aspherical coefficients.

Tables 1 and 2 show the relationships between the above-described conditional expressions and the numeric values in the numerical examples.

FIRST NUMERICAL EXAMPLE

Image Size Diagonal 11 mm
f = 4.45~57.85 Fno/1.90~2.80 2ω = 102.0°~10.9°
Bf 4.9990 Y 5.5

| | | | |
|---|---|---|---|
| *r1 = 227.195 | d1 = 2.50 | N1 = 1.7762 | v1 = 49.60 |
| r2 = 33.736 | d2 = 19.76 | | |
| r3 = 311.589 | d3 = 1.85 | N2 = 1.7584 | v2 = 52.32 |
| r4 = 80.391 | d4 = 13.54 | | |
| r5 = −80.728 | d5 = 1.75 | N3 = 1.7584 | v3 = 52.32 |
| r6 = −17642.010 | d6 = 1.30 | | |
| r7 = 135.169 | d7 = 6.62 | N4 = 1.8126 | v4 = 25.42 |
| r8 = −339.711 | d8 = 1.16 | | |
| r9 = 328.904 | d9 = 9.40 | N5 = 1.5183 | v5 = 64.14 |
| *r10 = −74.094 | d10 = 11.86 | | |
| r11 = 1211.778 | d11 = 8.57 | N6 = 1.4891 | v6 = 70.23 |
| r12 = −67.682 | d12 = 1.65 | N7 = 1.8881 | v7 = 40.76 |
| r13 = −126.215 | d13 = 0.20 | | |
| r14 = 182.391 | d14 = 1.65 | N8 = 2.0117 | v8 = 28.30 |
| r15 = 55.727 | d15 = 10.56 | N9 = 1.4985 | v9 = 81.54 |
| r16 = −405.898 | d16 = 0.20 | | |
| r17 = 130.732 | d17 = 9.01 | N10 = 1.4985 | v10 = 81.54 |
| r18 = −91.216 | d18 = 0.20 | | |
| r19 = 57.687 | d19 = 7.79 | N11 = 1.6229 | v11 = 60.29 |
| r20 = 1234.500 | d20 = variable | | |
| r21 = 52.721 | d21 = 0.75 | N12 = 1.8881 | v12 = 40.76 |
| r22 = 13.435 | d22 = 3.29 | | |
| r23 = 67.192 | d23 = 0.75 | N13 = 1.8881 | v13 = 40.76 |
| r24 = 36.490 | d24 = 2.83 | | |
| r25 = −48.656 | d25 = 4.75 | N14 = 1.8126 | v14 = 25.42 |
| r26 = −12.990 | d26 = 0.80 | N15 = 1.8881 | v15 = 40.76 |
| r27 = −1003.160 | d27 = 0.20 | | |
| r28 = 33.652 | d28 = 2.54 | N16 = 1.6942 | v16 = 31.07 |
| r29 = 1299.417 | d29 = variable | | |
| r30 = −26.243 | d30 = 0.75 | N17 = 1.7584 | v17 = 52.32 |
| r31 = 52.073 | d31 = 2.45 | N18 = 1.8164 | v18 = 22.76 |
| r32 = −173.421 | d32 = variable | | |
| r33 = stop | d33 = 1.40 | | |
| r34 = 14228.195 | d34 = 3.80 | N19 = 1.5914 | v19 = 61.14 |
| r35 = −38.640 | d35 = 0.20 | | |
| r36 = 92.642 | d36 = 3.10 | N20 = 1.4891 | v20 = 70.23 |
| r37 = −152.499 | d37 = 0.20 | | |
| r38 = 52.379 | d38 = 6.64 | N21 = 1.4891 | v21 = 70.23 |
| r39 = −39.203 | d39 = 1.20 | N22 = 1.8881 | v22 = 40.76 |
| r40 = 6905.542 | d40 = 34.00 | | |
| r41 = 65.930 | d41 = 5.39 | N23 = 1.5783 | v23 = 41.50 |
| r42 = −55.384 | d42 = 3.53 | | |
| r43 = 537.147 | d43 = 1.20 | N24 = 1.8881 | v24 = 40.76 |
| r44 = 23.184 | d44 = 5.27 | N25 = 1.5991 | v25 = 39.24 |
| r45 = −8948.954 | d45 = 0.24 | | |
| r46 = 49.707 | d46 = 6.16 | N26 = 1.5183 | v26 = 64.14 |
| r47 = −25.046 | d47 = 1.20 | N27 = 2.0117 | v27 = 28.30 |
| r48 = −456.658 | d48 = 0.39 | | |
| r49 = 62.510 | d49 = 4.70 | N28 = 1.4891 | v28 = 70.23 |
| r50 = −41.285 | d50 = 4.00 | | |
| r51 = ∞ | d51 = 33.00 | N29 = 1.6117 | v29 = 46.44 |
| r52 = ∞ | d52 = 13.20 | N30 = 1.5187 | v30 = 64.17 |
| r53 = ∞ | d53 = 5.00 | | |

| | Focal Length | | |
|---|---|---|---|
| Variable Distance | 4.45 | 13.795 | 57.85 |
| d20 | 0.91 | 28.60 | 44.72 |
| d29 | 42.27 | 11.11 | 6.22 |
| d32 | 9.00 | 12.47 | 1.24 |

Aspherical Shape

First Surface

R = 227.195    k = −54.217
B = 1.9066 · 10$^{-6}$    C = 3.7310 · 10$^{-11}$

-continued

| | |
|---|---|
| D = −1.9152 · 10⁻¹³ | E = −6.7753 · 10⁻¹⁹ |
| A' = −4.1287 · 10⁻⁶ | B' = −1.3218 · 10⁻⁸ |
| C' = 2.4226 · 10⁻¹² | D' = 2.4438 · 10⁻¹⁵ |

Tenth Surface

| | |
|---|---|
| R = −74.094 | k = −2.282 |
| B = −2.0884 · 10⁻⁷ | C = 2.9660 · 10⁻¹¹ |
| D = 3.4878 · 10⁻¹³ | E = −1.1872 · 10⁻¹⁶ |
| A' = −6.3672 · 10⁻⁷ | B' = 5.6104 · 10⁻¹⁰ |
| C' = −1.1116 · 10⁻¹¹ | D' = −3.1827 · 10⁻¹⁶ |

NUMERICAL EXAMPLE OF LENS UNIT IE

Image Size Diagonal 11 mm
f = 8.9~115.7 Fno/3.80~5.60 2ω = 63.4°~5.4°
Bf 4.9962 Y 5.5

| | | | |
|---|---|---|---|
| r1 = 40.307 | d1 = 6.08 | N1 = 1.4985 | ν1 = 81.54 |
| r2 = −75.735 | d2 = 0.24 | | |
| r3 = 36.904 | d3 = 5.04 | N2 = 1.6055 | ν2 = 60.64 |
| r4 = −107.008 | d4 = 0.84 | N3 = 1.8548 | ν3 = 23.90 |
| r5 = 87.515 | d5 = 11.76 | | |
| r6 = −116.601 | d6 = 3.01 | N4 = 1.8164 | ν4 = 22.76 |
| r7 = −23.612 | d7 = 0.56 | N5 = 1.8202 | ν5 = 46.62 |
| r8 = 20.218 | d8 = 4.98 | | |

SECOND NUMERICAL EXAMPLE

Image Size Diagonal 11 mm
f = 4.45~57.85 Fno/1.90~2.80 2ω = 102.0°~10.9°
Bf 4.9931 Y 5.5

| | | | |
|---|---|---|---|
| *r1 = 227.195 | d1 = 2.50 | N1 = 1.7762 | ν1 = 49.60 |
| r2 = 33.736 | d2 = 19.76 | | |
| r3 = 311.589 | d3 = 1.85 | N2 = 1.7584 | ν2 = 52.32 |
| r4 = 80.391 | d4 = 13.54 | | |
| r5 = −80.728 | d5 = 1.75 | N3 = 1.7584 | ν3 = 52.32 |
| r6 = −17642.010 | d6 = 1.30 | | |
| r7 = 135.169 | d7 = 6.62 | N4 = 1.8126 | ν4 = 25.42 |
| r8 = −339.711 | d8 = 1.16 | | |
| r9 = 328.904 | d9 = 9.40 | N5 = 1.5183 | ν5 = 64.14 |
| *r10 = −74.094 | d10 = 11.86 | | |
| r11 = 1211.778 | d11 = 8.57 | N6 = 1.4891 | ν6 = 70.23 |
| r12 = −67.682 | d12 = 1.65 | N7 = 1.8881 | ν7 = 40.76 |
| r13 = −126.215 | d13 = 0.20 | | |
| r14 = 182.391 | d14 = 1.65 | N8 = 2.0117 | ν8 = 28.30 |
| r15 = 55.727 | d15 = 10.56 | N9 = 1.4985 | ν9 = 81.54 |
| r16 = −405.898 | d16 = 0.20 | | |
| r17 = 130.732 | d17 = 9.01 | N10 = 1.4985 | ν10 = 81.54 |
| r18 = −91.216 | d18 = 0.20 | | |
| r19 = 57.687 | d19 = 7.79 | N11 = 1.6229 | ν11 = 60.29 |
| r20 = 1234.500 | d20 = variable | | |
| r21 = 52.721 | d21 = 0.75 | N12 = 1.8881 | ν12 = 40.76 |
| r22 = 13.435 | d22 = 3.29 | | |
| r23 = 67.192 | d23 = 0.75 | N13 = 1.8881 | ν13 = 40.76 |
| r24 = 36.490 | d24 = 2.83 | | |
| r25 = −48.656 | d25 = 4.75 | N14 = 1.8126 | ν14 = 25.42 |
| r26 = −12.990 | d26 = 0.80 | N15 = 1.8881 | ν15 = 40.76 |
| r27 = −1003.160 | d27 = 0.20 | | |
| r28 = 33.652 | d28 = 2.54 | N16 = 1.6942 | ν16 = 31.07 |
| r29 = 1299.417 | d29 = variable | | |
| r30 = −26.243 | d30 = 0.75 | N17 = 1.7584 | ν17 = 52.32 |
| r31 = 52.073 | d31 = 2.45 | N18 = 1.8164 | ν18 = 22.76 |
| r32 = −173.421 | d32 = variable | | |
| r33 = stop | d33 = 1.40 | | |
| r34 = −15623.885 | d34 = 3.39 | N19 = 1.5914 | ν19 = 61.14 |
| r35 = −45.151 | d35 = 0.20 | | |

-continued

Image Size Diagonal 11 mm
f = 4.45~57.85 Fno/1.90~2.80 2ω = 102.0°~10.9°
Bf 4.9931 Y 5.5

| | | | |
|---|---|---|---|
| r36 = 853.121 | d36 = 3.12 | N20 = 1.4891 | ν20 = 70.23 |
| r37 = −105.776 | d37 = 0.20 | | |
| r38 = 41.089 | d38 = 7.95 | N21 = 1.4891 | ν21 = 70.23 |
| r39 = −37.288 | d39 = 1.20 | N22 = 1.8881 | ν22 = 40.76 |
| r40 = −252.494 | d40 = 34.00 | | |
| r41 = 591.873 | d41 = 4.79 | N23 = 1.5967 | ν23 = 35.31 |
| r42 = −41.730 | d42 = 0.20 | | |
| r43 = 88.052 | d43 = 5.27 | N24 = 1.5967 | ν24 = 35.31 |
| r44 = −42.116 | d44 = 1.20 | N25 = 1.8881 | ν25 = 40.76 |
| r45 = −296.998 | d45 = 0.24 | | |
| r46 = 37.310 | d46 = 6.03 | N26 = 1.4891 | ν26 = 70.23 |
| r47 = −35.443 | d47 = 1.20 | N27 = 2.0117 | ν27 = 28.30 |
| r48 = 44.112 | d48 = 0.81 | | |
| r49 = 33.024 | d49 = 4.97 | N28 = 1.4985 | ν28 = 81.54 |
| r50 = −55.651 | d50 = 4.00 | | |
| r51 = ∞ | d51 = 33.00 | N29 = 1.6117 | ν29 = 46.44 |
| r52 = ∞ | d52 = 13.20 | N30 = 1.5187 | ν30 = 64.17 |
| r53 = ∞ | d53 = 5.00 | | |

| | Focal Length | | |
|---|---|---|---|
| Variable Distance | 4.45 | 13.795 | 57.85 |
| d20 | 0.91 | 28.60 | 44.72 |
| d29 | 42.27 | 11.11 | 6.22 |
| d32 | 9.00 | 12.47 | 1.24 |

Aspherical Shape

First Surface

| | |
|---|---|
| R = 227.195 | k = −54.217 |
| B = 1.9066 · 10⁻⁶ | C = 3.7310 · 10⁻¹¹ |
| D = −1.9152 · 10⁻¹³ | E = −6.7753 · 10⁻¹⁹ |
| A' = −4.1287 · 10⁻⁶ | B' = −1.3218 · 10⁻⁸ |
| C' = 2.4226 · 10⁻¹² | D' = 2.4438 · 10⁻¹⁵ |

Tenth Surface

| | |
|---|---|
| R = −74.094 | k = −2.282 |
| B = −2.0884 · 10⁻⁷ | C = 2.9660 · 10⁻¹¹ |
| D = 3.4878 · 10⁻¹³ | E = −1.1872 · 10⁻¹⁶ |
| A' = −6.3672 · 10⁻⁷ | B' = 5.6104 · 10⁻¹⁰ |
| C' = −1.1116 · 10⁻¹¹ | D' = −3.1827 · 10⁻¹⁶ |

THIRD NUMERICAL EXAMPLE

Image Size Diagonal 11 mm
f = 4.45~57.85 Fno/1.90~2.80 2ω = 102.0°~10.9°
Bf 4.9970 Y 5.5

| | | | |
|---|---|---|---|
| *r1 = 227.195 | d1 = 2.50 | N1 = 1.7762 | ν1 = 49.60 |
| r2 = 33.736 | d2 = 19.76 | | |
| r3 = 311.589 | d3 = 1.85 | N2 = 1.7584 | ν2 = 52.32 |
| r4 = 80.391 | d4 = 13.54 | | |
| r5 = −80.728 | d5 = 1.75 | N3 = 1.7584 | ν3 = 52.32 |
| r6 = −17642.010 | d6 = 1.30 | | |
| r7 = 135.169 | d7 = 6.62 | N4 = 1.8126 | ν4 = 25.42 |
| r8 = −339.711 | d8 = 1.16 | | |
| r9 = 328.904 | d9 = 9.40 | N5 = 1.5183 | ν5 = 64.14 |
| *r10 = −74.094 | d10 = 11.86 | | |
| r11 = 1211.778 | d11 = 8.57 | N6 = 1.4891 | ν6 = 70.23 |
| r12 = −67.682 | d12 = 1.65 | N7 = 1.8881 | ν7 = 40.76 |
| r13 = −126.215 | d13 = 0.20 | | |
| r14 = 182.391 | d14 = 1.65 | N8 = 2.0117 | ν8 = 28.30 |
| r15 = 55.727 | d15 = 10.56 | N9 = 1.4985 | ν9 = 81.54 |
| r16 = −405.898 | d16 = 0.20 | | |
| r17 = 130.732 | d17 = 9.01 | N10 = 1.4985 | ν10 = 81.54 |
| r18 = −91.216 | d18 = 0.20 | | |
| r19 = 57.687 | d19 = 7.79 | N11 = 1.6229 | ν11 = 60.29 |

-continued

Image Size Diagonal 11 mm
f = 4.45~57.85 Fno/1.90~2.80 2ω = 102.0°~10.9°
Bf 4.9970 Y 5.5

| | | | |
|---|---|---|---|
| r20 = 1234.500 | d20 = variable | | |
| r21 = 52.721 | d21 = 0.75 | N12 = 1.8881 | ν12 = 40.76 |
| r22 = 13.435 | d22 = 3.29 | | |
| r23 = 67.192 | d23 = 0.75 | N13 = 1.8881 | ν13 = 40.76 |
| r24 = 36.490 | d24 = 2.83 | | |
| r25 = −48.656 | d25 = 4.75 | N14 = 1.8126 | ν14 = 25.42 |
| r26 = −12.990 | d26 = 0.80 | N15 = 1.8881 | ν15 = 40.76 |
| r27 = −1003.160 | d27 = 0.20 | | |
| r28 = 33.652 | d28 = 2.54 | N16 = 1.6942 | ν16 = 31.07 |
| r29 = 1299.417 | d29 = variable | | |
| r30 = −26.243 | d30 = 0.75 | N17 = 1.7584 | ν17 = 52.32 |
| r31 = 52.073 | d31 = 2.45 | N18 = 1.8164 | ν18 = 22.76 |
| r32 = −173.421 | d32 = variable | | |
| r33 = stop | d33 = 1.40 | | |
| r34 = −4484.945 | d34 = 4.23 | N19 = 1.5914 | ν19 = 61.14 |
| r35 = −33.960 | d35 = 0.20 | | |
| r36 = 382.348 | d36 = 3.47 | N20 = 1.4891 | ν20 = 70.23 |
| r37 = −84.792 | d37 = 0.20 | | |
| r38 = 40.593 | d38 = 7.14 | N21 = 1.4891 | ν21 = 70.23 |
| r39 = −39.952 | d39 = 1.20 | N22 = 1.8881 | ν22 = 40.76 |
| r40 = 212.532 | d40 = 34.00 | | |
| r41 = 33.473 | d41 = 6.27 | N23 = 1.5783 | ν23 = 41.50 |
| r42 = −78.955 | d42 = 0.81 | | |
| r43 = −134.302 | d43 = 1.20 | N24 = 1.8881 | ν24 = 40.76 |
| r44 = 27.281 | d44 = 5.64 | N25 = 1.5967 | ν25 = 35.31 |
| r45 = −164.887 | d45 = 5.27 | | |
| r46 = 398.087 | d46 = 1.20 | N26 = 2.0117 | ν26 = 28.30 |
| r47 = 23.958 | d47 = 6.47 | N27 = 1.4891 | ν27 = 70.23 |
| r48 = −48.297 | d48 = 0.15 | | |
| r49 = 27.896 | d49 = 4.93 | N28 = 1.4891 | ν28 = 70.23 |
| r50 = −377.442 | d50 = 4.00 | | |
| r51 = ∞ | d51 = 33.00 | N29 = 1.6117 | ν29 = 46.44 |
| r52 = ∞ | d52 = 13.20 | N30 = 1.5187 | ν30 = 64.17 |
| r53 = ∞ | d53 = 5.00 | | |

| | Focal Length | | |
|---|---|---|---|
| Variable Distance | 4.45 | 13.795 | 57.85 |
| d20 | 0.91 | 28.60 | 44.72 |
| d29 | 42.27 | 11.11 | 6.22 |
| d32 | 9.00 | 12.47 | 1.24 |

Aspherical Shape

First Surface

R = 227.195  k = −54.217
B = 1.9066 · 10$^{-6}$  C = 3.7310 · 10$^{-11}$
D = −1.9152 · 10$^{-13}$  E = −6.7753 · 10$^{-19}$
A' = −4.1287 · 10$^{-6}$  B' = −1.3218 · 10$^{-8}$
C' = 2.4226 · 10$^{-12}$  D' = 2.4438 · 10$^{-15}$

Tenth Surface

R = −74.094  k = −2.282
B = −2.0884 · 10$^{-7}$  C = 2.9660 · 10$^{-11}$
D = 3.4878 · 10$^{-13}$  E = −1.1872 · 10$^{-16}$
A' = −6.3672 · 10$^{-7}$  B' = 5.6104 · 10$^{-10}$
C' = −1.1116 · 10$^{-11}$  D' = −3.1827 · 10$^{-16}$

FOURTH NUMERICAL EXAMPLE

Image Size Diagonal 11 mm
f = 4.45~57.85 Fno/1.90~2.80 2ω = 102.0°~10.9°
Bf 4.9978 Y 5.5

| | | | |
|---|---|---|---|
| *r1 = 227.195 | d1 = 2.50 | N1 = 1.7762 | ν1 = 49.60 |
| r2 = 33.736 | d2 = 19.76 | | |
| r3 = 311.589 | d3 = 1.85 | N2 = 1.7584 | ν2 = 52.32 |
| r4 = 80.391 | d4 = 13.54 | | |

-continued

Image Size Diagonal 11 mm
f = 4.45~57.85 Fno/1.90~2.80 2ω = 102.0°~10.9°
Bf 4.9978 Y 5.5

| | | | |
|---|---|---|---|
| r5 = −80.728 | d5 = 1.75 | N3 = 1.7584 | ν3 = 52.32 |
| r6 = −17642.010 | d6 = 1.30 | | |
| r7 = 135.169 | d7 = 6.62 | N4 = 1.8126 | ν4 = 25.42 |
| r8 = −339.711 | d8 = 1.16 | | |
| r9 = 328.904 | d9 = 9.40 | N5 = 1.5183 | ν5 = 64.14 |
| *r10 = −74.094 | d10 = 11.86 | | |
| r11 = 1211.778 | d11 = 8.57 | N6 = 1.4891 | ν6 = 70.23 |
| r12 = −67.682 | d12 = 1.65 | N7 = 1.8881 | ν7 = 40.76 |
| r13 = −126.215 | d13 = 0.20 | | |
| r14 = 182.391 | d14 = 1.65 | N8 = 2.0117 | ν8 = 28.30 |
| r15 = 55.727 | d15 = 10.56 | N9 = 1.4985 | ν9 = 81.54 |
| r16 = −405.898 | d16 = 0.20 | | |
| r17 = 130.732 | d17 = 9.01 | N10 = 1.4985 | ν10 = 81.54 |
| r18 = −91.216 | d18 = 0.20 | | |
| r19 = 57.687 | d19 = 7.79 | N11 = 1.6229 | ν11 = 60.29 |
| r20 = 1234.500 | d20 = variable | | |
| r21 = 52.721 | d21 = 0.75 | N12 = 1.8881 | ν12 = 40.76 |
| r22 = 13.435 | d22 = 3.29 | | |
| r23 = 67.192 | d23 = 0.75 | N13 = 1.8881 | ν13 = 40.76 |
| r24 = 36.490 | d24 = 2.83 | | |
| r25 = −48.656 | d25 = 4.75 | N14 = 1.8126 | ν14 = 25.42 |
| r26 = −12.990 | d26 = 0.80 | N15 = 1.8881 | ν15 = 40.76 |
| r27 = −1003.160 | d27 = 0.20 | | |
| r28 = 33.652 | d28 = 2.54 | N16 = 1.6942 | ν16 = 31.07 |
| r29 = 1299.417 | d29 = variable | | |
| r30 = −26.243 | d30 = 0.75 | N17 = 1.7584 | ν17 = 52.32 |
| r31 = 52.073 | d31 = 2.45 | N18 = 1.8164 | ν18 = 22.76 |
| r32 = −173.421 | d32 = variable | | |
| r33 = stop | d33 = 1.40 | | |
| r34 = −13787.893 | d34 = 3.92 | N19 = 1.5914 | ν19 = 61.14 |
| r35 = −36.917 | d35 = 0.20 | | |
| r36 = 106.127 | d36 = 3.35 | N20 = 1.4891 | ν20 = 70.23 |
| r37 = −95.836 | d37 = 0.20 | | |
| r38 = 48.085 | d38 = 6.72 | N21 = 1.4891 | ν21 = 70.23 |
| r39 = −38.635 | d39 = 1.20 | N22 = 1.8881 | ν22 = 40.76 |
| r40 = 293.252 | d40 = 34.00 | | |
| r41 = 204.940 | d41 = 4.18 | N23 = 1.7044 | ν23 = 30.13 |
| r42 = −54.231 | d42 = 2.66 | | |
| r43 = 39.548 | d43 = 1.20 | N24 = 1.7323 | ν24 = 54.68 |
| r44 = 21.900 | d44 = 1.74 | | |
| r45 = 24.680 | d45 = 8.75 | N25 = 1.4985 | ν25 = 81.54 |
| r46 = −25.451 | d46 = 1.20 | N26 = 2.0117 | ν26 = 28.30 |
| r47 = 436.838 | d47 = 2.00 | | |
| r48 = 90.478 | d48 = 5.06 | N27 = 1.4891 | ν27 = 70.23 |
| r49 = −31.140 | d49 = 4.00 | | |
| r50 = ∞ | d50 = 33.00 | N28 = 1.6117 | ν28 = 46.44 |
| r51 = ∞ | d51 = 13.20 | N29 = 1.5187 | ν29 = 64.17 |
| r52 = ∞ | d52 = 5.00 | | |

| | Focal Length | | |
|---|---|---|---|
| Variable Distance | 4.45 | 13.795 | 57.85 |
| d20 | 0.91 | 28.60 | 44.72 |
| d29 | 42.27 | 11.11 | 6.22 |
| d32 | 9.00 | 12.47 | 1.24 |

Aspherical Surface

First Surface

R = 227.195  k = −54.217
B = 1.9066 · 10$^{-6}$  C = 3.7310 · 10$^{-11}$
D = −1.9152 · 10$^{-13}$  E = −6.7753 · 10$^{-19}$
A' = −4.1287 · 10$^{-6}$  B' = −1.3218 · 10$^{-8}$
C' = 2.4226 · 10$^{-12}$  D' = 2.4438 · 10$^{-15}$

Tenth Surface

R = −74.094  k = −2.282
B = −2.0884 · 10$^{-7}$  C = 2.9660 · 10$^{-11}$
D = 3.4878 · 10$^{-13}$  E = −1.1872 · 10$^{-16}$
A' = −6.3672 · 10$^{-7}$  B' = 5.6104 · 10$^{-10}$
C' = −1.1116 · 10$^{-11}$  D' = −3.1827 · 10$^{-16}$

FIFTH NUMERICAL EXAMPLE

Image Size Diagonal 11 mm
f = 4.45~57.85 Fno/1.90~2.80 2ω = 102.0°~10.9°
Bf 4.9974 Y 5.5

| | | | |
|---|---|---|---|
| *r1 = 227.195 | d1 = 2.50 | N1 = 1.7762 | ν1 = 49.60 |
| r2 = 33.736 | d2 = 19.76 | | |
| r3 = 311.589 | d3 = 1.85 | N2 = 1.7584 | ν2 = 52.32 |
| r4 = 80.391 | d4 = 13.54 | | |
| r5 = −80.728 | d5 = 1.75 | N3 = 1.7584 | ν3 = 52.32 |
| r6 = −17642.010 | d6 = 1.30 | | |
| r7 = 135.169 | d7 = 6.62 | N4 = 1.8126 | ν4 = 25.42 |
| r8 = −339.711 | d8 = 1.16 | | |
| r9 = 328.904 | d9 = 9.40 | N5 = 1.5183 | ν5 = 64.14 |
| *r10 = −74.094 | d10 = 11.86 | | |
| r11 = 1211.778 | d11 = 8.57 | N6 = 1.4891 | ν6 = 70.23 |
| r12 = −67.682 | d12 = 1.65 | N7 = 1.8881 | ν7 = 40.76 |
| r13 = −126.215 | d13 = 0.20 | | |
| r14 = 182.391 | d14 = 1.65 | N8 = 2.0117 | ν8 = 28.30 |
| r15 = 55.727 | d15 = 10.56 | N9 = 1.4985 | ν9 = 81.54 |
| r16 = −405.898 | d16 = 0.20 | | |
| r17 = 130.732 | d17 = 9.01 | N10 = 1.4985 | ν10 = 81.54 |
| r18 = −91.216 | d18 = 0.20 | | |
| r19 = 57.687 | d19 = 7.79 | N11 = 1.6229 | ν11 = 60.29 |
| r20 = 1234.500 | d20 = variable | | |
| r21 = 52.721 | d21 = 0.75 | N12 = 1.8881 | ν12 = 40.76 |
| r22 = 13.435 | d22 = 3.29 | | |
| r23 = 67.192 | d23 = 0.75 | N13 = 1.8881 | ν13 = 40.76 |
| r24 = 36.490 | d24 = 2.83 | | |
| r25 = −48.656 | d25 = 4.75 | N14 = 1.8126 | ν14 = 25.42 |
| r26 = −12.990 | d26 = 0.80 | N15 = 1.8881 | ν15 = 40.76 |
| r27 = −1003.160 | d27 = 0.20 | | |
| r28 = 33.652 | d28 = 2.54 | N16 = 1.6942 | ν16 = 31.07 |
| r29 = 1299.417 | d29 = variable | | |
| r30 = −26.243 | d30 = 0.75 | N17 = 1.7584 | ν17 = 52.32 |
| r31 = 52.073 | d31 = 2.45 | N18 = 1.8164 | ν18 = 22.76 |
| r32 = −173.421 | d32 = variable | | |
| r33 = stop | d33 = 1.40 | | |
| r34 = 606.159 | d34 = 3.51 | N19 = 1.5914 | ν19 = 61.14 |
| r35 = −46.528 | d35 = 0.20 | | |
| r36 = 96.040 | d36 = 3.60 | N20 = 1.4891 | ν20 = 70.23 |
| r37 = −97.979 | d37 = 0.20 | | |
| r38 = 44.810 | d38 = 6.80 | N21 = 1.4891 | ν21 = 70.23 |
| r39 = −44.033 | d39 = 1.20 | N22 = 1.8881 | ν22 = 40.76 |
| r40 = 320.626 | d40 = 34.00 | | |
| r41 = 45.982 | d41 = 5.59 | N23 = 1.5783 | ν23 = 41.50 |
| r42 = −67.644 | d42 = 1.94 | | |
| r43 = −178.506 | d43 = 1.20 | N24 = 1.8881 | ν24 = 40.76 |
| r44 = 28.093 | d44 = 1.14 | | |
| r45 = 38.911 | d45 = 4.99 | N25 = 1.5991 | ν25 = 39.24 |
| r46 = −77.231 | d46 = 0.24 | | |
| r47 = 44.915 | d47 = 5.46 | N26 = 1.4891 | ν26 = 70.23 |
| r48 = −39.741 | d48 = 1.82 | | |
| r49 = −31.164 | d49 = 1.20 | N27 = 2.0117 | ν27 = 28.30 |
| r50 = 232.885 | d50 = 1.14 | | |
| r51 = 44.785 | d51 = 5.91 | N28 = 1.4891 | ν28 = 70.23 |
| r52 = −33.328 | d52 = 4.00 | | |
| r53 = ∞ | d53 = 33.00 | N29 = 1.6117 | ν29 = 46.44 |
| r54 = ∞ | d54 = 13.20 | N30 = 1.5187 | ν30 = 64.17 |
| r55 = ∞ | d55 = 5.00 | | |

Focal Length

| Variable Distance | 4.45 | 13.795 | 57.85 |
|---|---|---|---|
| d20 | 0.91 | 28.60 | 44.72 |
| d29 | 42.27 | 11.11 | 6.22 |
| d32 | 9.00 | 12.47 | 1.24 |

Aspherical Shape

First Surface

R = 227.195  k = −54.217
B = 1.9066 · 10⁻⁶  C = 3.7310 · 10⁻¹¹
D = −1.9152 · 10⁻¹³  E = −6.7753 · 10⁻¹⁹

-continued

Image Size Diagonal 11 mm
f = 4.45~57.85 Fno/1.90~2.80 2ω = 102.0°~10.9°
Bf 4.9974 Y 5.5

A' = −4.1287 · 10⁻⁶  B' = −1.3218 · 10⁻⁸
C' = 2.4226 · 10⁻¹²  D' = 2.4438 · 10⁻¹⁵

Tenth Surface

R = −74.094  k = −2.282
B = −2.0884 · 10⁻⁷  C = 2.9660 · 10⁻¹¹
D = 3.4878 · 10⁻¹³  E = −1.1872 · 10⁻¹⁶
A' = −6.3672 · 10⁻⁷  B' = 5.6104 · 10⁻¹⁰
C' = −1.1116 · 10⁻¹¹  D' = −3.1827 · 10⁻¹⁶

SIXTH NUMERICAL EXAMPLE

Image Size Diagonal 11 mm
f = 4.45~57.85 Fno/1.90~2.80 2ω = 102.0°~10.9°
Bf 4.9951 Y 5.5

| | | | |
|---|---|---|---|
| *r1 = 227.195 | d1 = 2.50 | N1 = 1.7762 | ν1 = 49.60 |
| r2 = 33.736 | d2 = 19.76 | | |
| r3 = 311.589 | d3 = 1.85 | N2 = 1.7584 | ν2 = 52.32 |
| r4 = 80.391 | d4 = 13.54 | | |
| r5 = −80.728 | d5 = 1.75 | N3 = 1.7584 | ν3 = 52.32 |
| r6 = −17642.010 | d6 = 1.30 | | |
| r7 = 135.169 | d7 = 6.62 | N4 = 1.8126 | ν4 = 25.42 |
| r8 = −339.711 | d8 = 1.16 | | |
| r9 = 328.904 | d9 = 9.40 | N5 = 1.5183 | ν5 = 64.14 |
| *r10 = −74.094 | d10 = 11.86 | | |
| r11 = 1211.778 | d11 = 8.57 | N6 = 1.4891 | ν6 = 70.23 |
| r12 = −67.682 | d12 = 1.65 | N7 = 1.8881 | ν7 = 40.76 |
| r13 = −126.215 | d13 = 0.20 | | |
| r14 = 182.391 | d14 = 1.65 | N8 = 2.0117 | ν8 = 28.30 |
| r15 = 55.727 | d15 = 10.56 | N9 = 1.4985 | ν9 = 81.54 |
| r16 = −405.898 | d16 = 0.20 | | |
| r17 = 130.732 | d17 = 9.01 | N10 = 1.4985 | ν10 = 81.54 |
| r18 = −91.216 | d18 = 0.20 | | |
| r19 = 57.687 | d19 = 7.79 | N11 = 1.6229 | ν11 = 60.29 |
| r20 = 1234.500 | d20 = variable | | |
| r21 = 52.721 | d21 = 0.75 | N12 = 1.8881 | ν12 = 40.76 |
| r22 = 13.435 | d22 = 3.29 | | |
| r23 = 67.192 | d23 = 0.75 | N13 = 1.8881 | ν13 = 40.76 |
| r24 = 36.490 | d24 = 2.83 | | |
| r25 = −48.656 | d25 = 4.75 | N14 = 1.8126 | ν14 = 25.42 |
| r26 = −12.990 | d26 = 0.80 | N15 = 1.8881 | ν15 = 40.76 |
| r27 = −1003.160 | d27 = 0.20 | | |
| r28 = 33.652 | d28 = 2.54 | N16 = 1.6942 | ν16 = 31.07 |
| r29 = 1299.417 | d29 = variable | | |
| r30 = −26.243 | d30 = 0.75 | N17 = 1.7584 | ν17 = 52.32 |
| r31 = 52.073 | d31 = 2.45 | N18 = 1.8164 | ν18 = 22.76 |
| r32 = −173.421 | d32 = variable | | |
| r33 = stop | d33 = 1.40 | | |
| r34 = −21035.899 | d34 = 3.57 | N19 = 1.5914 | ν19 = 61.14 |
| r35 = −41.941 | d35 = 0.20 | | |
| r36 = 122.171 | d36 = 3.69 | N20 = 1.4891 | ν20 = 70.23 |
| r37 = −125.981 | d37 = 0.20 | | |
| r38 = 51.909 | d38 = 6.78 | N21 = 1.4891 | ν21 = 70.23 |
| r39 = −39.935 | d39 = 1.20 | N22 = 1.8881 | ν22 = 40.76 |
| r40 = −544.175 | d40 = 34.00 | | |
| r41 = 131.979 | d41 = 3.75 | N23 = 1.5783 | ν23 = 41.50 |
| r42 = −107.599 | d42 = 0.20 | | |
| r43 = 58.782 | d43 = 5.12 | N24 = 1.5783 | ν24 = 41.50 |
| r44 = −67.480 | d44 = 0.20 | | |
| r45 = −339.467 | d45 = 1.20 | N25 = 1.8881 | ν25 = 40.76 |
| r46 = 22.761 | d46 = 5.32 | N26 = 1.5991 | ν26 = 39.24 |
| r47 = 252.987 | d47 = 0.24 | | |
| r48 = 52.074 | d48 = 6.32 | N27 = 1.5183 | ν27 = 64.14 |
| r49 = −25.243 | d49 = 1.20 | N28 = 2.0117 | ν28 = 28.30 |
| r50 = 2390.369 | d50 = 0.28 | | |
| r51 = 61.444 | d51 = 4.60 | N29 = 1.4891 | ν29 = 70.23 |
| r52 = −41.699 | d52 = 4.00 | | |

-continued

Image Size Diagonal 11 mm
f = 4.45~57.85 Fno/1.90~2.80 2ω = 102.0°~10.9°
Bf 4.9951 Y 5.5

| r53 = ∞ | d53 = 33.00 | N30 = 1.6117 | ν30 = 46.44 |
| r54 = ∞ | d54 = 13.20 | N31 = 1.5187 | ν31 = 64.17 |
| r55 = ∞ | d55 = 5.00 | | |

Focal Length

| Variable Distance | 4.45 | 13.795 | 57.85 |
|---|---|---|---|
| d20 | 0.91 | 28.60 | 44.72 |
| d29 | 42.27 | 11.11 | 6.22 |
| d32 | 9.00 | 12.47 | 1.24 |

Aspherical Shape

First Surface

R = 227.195                k = −54.217
B = 1.9066 · $10^{-6}$         C = 3.7310 · $10^{-11}$
D = −1.9152 · $10^{-13}$       E = −6.7753 · $10^{-19}$
A' = −4.1287 · $10^{-6}$       B' = −1.3218 · $10^{-8}$
C' = 2.4226 · $10^{-12}$       D' = 2.4438 · $10^{-15}$

Tenth Surface

R = −74.094                k = −2.282
B = −2.0884 · $10^{-7}$        C = 2.9660 · $10^{-11}$
D = 3.4878 · $10^{-13}$        E = −1.1872 · $10^{-16}$
A' = −6.3672 · $10^{-7}$       B' = 5.6104 · $10^{-10}$
C' = −1.1116 · $10^{-11}$      D' = −3.1827 · $10^{-16}$

SEVENTH NUMERICAL EXAMPLE

Image Size Diagonal 11 mm
f = 4.45~57.85 Fno/1.90~2.80 2ω = 102.0°~10.9°
Bf 4.9931 Y 5.5

| *r1 = 227.195 | d1 = 2.50 | N1 = 1.7762 | ν1 = 49.60 |
| r2 = 33.736 | d2 = 19.76 | | |
| r3 = 311.589 | d3 = 1.85 | N2 = 1.7584 | ν2 = 52.32 |
| r4 = 80.391 | d4 = 13.54 | | |
| r5 = −80.728 | d5 = 1.75 | N3 = 1.7584 | ν3 = 52.32 |
| r6 = −17642.010 | d6 = 1.30 | | |
| r7 = 135.169 | d7 = 6.62 | N4 = 1.8126 | ν4 = 25.42 |
| r8 = −339.711 | d8 = 1.16 | | |
| r9 = 328.904 | d9 = 9.40 | N5 = 1.5183 | ν5 = 64.14 |
| *r10 = −74.094 | d10 = 11.86 | | |
| r11 = 1211.778 | d11 = 8.57 | N6 = 1.4891 | ν6 = 70.23 |
| r12 = −67.682 | d12 = 1.65 | N7 = 1.8881 | ν7 = 40.76 |
| r13 = −126.215 | d13 = 0.20 | | |
| r14 = 182.391 | d14 = 1.65 | N8 = 2.0117 | ν8 = 28.30 |
| r15 = 55.727 | d15 = 10.56 | N9 = 1.4985 | ν9 = 81.54 |
| r16 = −405.898 | d16 = 0.20 | | |
| r17 = 130.732 | d17 = 9.01 | N10 = 1.4985 | ν10 = 81.54 |
| r18 = −91.216 | d18 = 0.20 | | |
| r19 = 57.687 | d19 = 7.79 | N11 = 1.6229 | ν11 = 60.29 |
| r20 = 1234.500 | d20 = variable | | |
| r21 = 52.721 | d21 = 0.75 | N12 = 1.8881 | ν12 = 40.76 |
| r22 = 13.435 | d22 = 3.29 | | |
| r23 = 67.192 | d23 = 0.75 | N13 = 1.8881 | ν13 = 40.76 |
| r24 = 36.490 | d24 = 2.83 | | |
| r25 = −48.656 | d25 = 4.75 | N14 = 1.8126 | ν14 = 25.42 |
| r26 = −12.990 | d26 = 0.80 | N15 = 1.8881 | ν15 = 40.76 |
| r27 = −1003.160 | d27 = 0.20 | | |
| r28 = 33.652 | d28 = 2.54 | N16 = 1.6942 | ν16 = 31.07 |
| r29 = 1299.417 | d29 = variable | | |
| r30 = −26.243 | d30 = 0.75 | N17 = 1.7584 | ν17 = 52.32 |
| r31 = 52.073 | d31 = 2.45 | N18 = 1.8164 | ν18 = 22.76 |
| r32 = −173.421 | d32 = variable | | |
| r33 = stop | d33 = 1.40 | | |
| r34 = −26969.015 | d34 = 3.80 | N19 = 1.5914 | ν19 = 61.14 |
| r35 = −38.478 | d35 = 0.20 | | |
| r36 = 102.927 | d36 = 3.25 | N20 = 1.4891 | ν20 = 70.23 |
| r37 = −129.303 | d37 = 0.20 | | |
| r38 = 52.142 | d38 = 6.70 | N21 = 1.4891 | ν21 = 70.23 |
| r39 = −39.230 | d39 = 1.20 | N22 = 1.8881 | ν22 = 40.76 |
| r40 = 3435.984 | d40 = 34.00 | | |
| r41 = 60.084 | d41 = 5.31 | N23 = 1.5783 | ν23 = 41.50 |
| r42 = −59.864 | d42 = 3.06 | | |
| r43 = 440.992 | d43 = 1.20 | N24 = 1.8881 | ν24 = 40.76 |
| r44 = 21.290 | d44 = 6.12 | N25 = 1.5967 | ν25 = 35.31 |
| r45 = −227.554 | d45 = 0.24 | | |
| r46 = 80.690 | d46 = 5.53 | N26 = 1.5183 | ν26 = 64.14 |
| r47 = −25.508 | d47 = 1.20 | N27 = 1.8126 | ν27 = 25.42 |
| r48 = 246.480 | d48 = 2.06 | | |
| r49 = 44.046 | d49 = 4.77 | N28 = 1.4891 | ν28 = 70.23 |
| r50 = −57.645 | d50 = 4.00 | | |
| r51 = ∞ | d51 = 33.00 | N29 = 1.6117 | ν29 = 46.44 |
| r52 = ∞ | d52 = 13.20 | N30 = 1.5187 | ν30 = 64.17 |
| r53 = ∞ | d53 = 5.00 | | |

Focal Length

| Variable Distance | 4.45 | 13.795 | 57.85 |
|---|---|---|---|
| d20 | 0.91 | 28.60 | 44.72 |
| d29 | 42.27 | 11.11 | 6.22 |
| d32 | 9.00 | 12.47 | 1.24 |

Aspherical Shape

First Surface

R = 227.195                k = −54.217
B = 1.9066 · $10^{-6}$         C = 3.7310 · $10^{-11}$
D = −1.9152 · $10^{-13}$       E = −6.7753 · $10^{-19}$
A' = −4.1287 · $10^{-6}$       B' = −1.3218 · $10^{-8}$
C' = 2.4226 · $10^{-12}$       D' = 2.4438 · $10^{-15}$

Tenth Surface

R = −74.094                k = −2.282
B = −2.0884 · $10^{-7}$        C = 2.9660 · $10^{-11}$
D = 3.4878 · $10^{-13}$        E = −1.1872 · $10^{-16}$
A' = −6.3672 · $10^{-7}$       B' = 5.6104 · $10^{-10}$
C' = −1.1116 · $10^{-11}$      D' = −3.1827 · $10^{-16}$

TABLE 1

| Conditional Expression | | First Exemplary Embodiment | Second Exemplary Embodiment | Third Exemplary Embodiment | Fourth Exemplary Embodiment |
|---|---|---|---|---|---|
| 1 | ν1p/ν1n | 0.99 | 0.87 | 0.94 | 0.55 |
| 2 | ν2p/ν2n | 2.37 | 2.68 | 2.48 | 2.68 |
| 3 | θ2n + 0.00162 × ν2n | 0.644 | 0.644 | 0.644 | 0.644 |
| 4 | (θ2n − θ2p)/(ν2p − ν2n) | 0.00168 | 0.00135 | 0.00162 | 0.00135 |

TABLE 1-continued

| Conditional Expression | | Fifth Exemplary Embodiment | Sixth Exemplary Embodiment | Seventh Exemplary Embodiment |
|---|---|---|---|---|
| 1 | ν1p/ν1n | 0.99 | 0.99 | 0.94 |
| 2 | ν2p/ν2n | 2.48 | 2.37 | 2.64 |
| 3 | θ2n + 0.00162 × ν2n | 0.644 | 0.644 | 0.657 |
| 4 | (θ2n − θ2p)/(ν2p − ν2n) | 0.00162 | 0.00168 | 0.00200 |

TABLE 2

| Conditional Expression | | First Exemplary Embodiment | Second Exemplary Embodiment | Third Exemplary Embodiment | Fourth Exemplary Embodiment | Fifth Exemplary Embodiment | Sixth Exemplary Embodiment | Seventh Exemplary Embodiment |
|---|---|---|---|---|---|---|---|---|
| 5 | f1p/f1n | −0.817 | −0.503 | −0.797 | −0.888 | −0.843 | −0.802 | −0.804 |
| 6 | f2p/f2n | −0.768 | −1.042 | −0.819 | −0.723 | −0.774 | −0.826 | −0.773 |
| 7 | fw/IS | 0.405 | 0.405 | 0.405 | 0.405 | 0.405 | 0.405 | 0.405 |

According to the above-described exemplary embodiments, it is possible to obtain a zoom lens having high optical performance over the entire zoom range and an image pickup apparatus including the zoom lens.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-201727 filed Aug. 2, 2007, which is hereby incorporated by reference herein in its entirety.

What is claimed is:

1. A zoom lens comprising:
a first lens unit that does not move for zooming and that has a positive refractive power;
a second lens unit that is configured to move to an image side during zooming from a wide angle end to a telephoto end, and that has a negative refractive power;
a third lens unit that is configured to reduce image plane variation due to zooming; and
a fourth lens unit that does not move for zooming,
wherein the first to fourth lens units are arranged in that order from an object side to the image side of the zoom lens,
wherein the fourth lens unit comprises a fourth-F unit and a fourth-B unit that are arranged in that order from the object side and facing each other across the longest air gap in the fourth lens unit,
wherein the fourth-B unit comprises two negative lenses and at least three positive lenses, and comprises a fourth-B1 unit and a fourth-B2 unit,
wherein the center of a thickness of at least one lens included in the fourth-B1 unit is closer to the object side than the center of a total length of the fourth-B unit, and the center of a thickness of at least one lens included in the fourth-B2 unit is closer to the image side than the center of the total length of the fourth-B unit,
wherein each of the fourth-B1 unit and the fourth-B2 unit includes at least one negative lens and at least one positive lens, and wherein the following conditions are satisfied:

$$0.50 < \nu1p/\nu1n < 1.10$$

$$2.30 < \nu2p/\nu2n$$

where ν1p represents an average of Abbe number of material of the at least one positive lens in the fourth-B1 unit, ν2p represents an average of Abbe number of material of the at least one positive lens in the fourth-B2 unit, ν1n represents an average of Abbe number of material of the at least one negative lens in the fourth-B1 unit, and ν2n represents an average of Abbe number of material of the at least one negative lens in the fourth-B2 unit.

2. The zoom lens according to claim 1, wherein the following conditions are satisfied:

$$\theta2n + 0.00162 \times \nu2n < 0.670$$

$$(\theta2n - \theta2p)/(\nu2p - \nu2n) < 0.0023$$

where ν2p and θ2p respectively represent the Abbe number and a partial dispersion ratio of the material of the positive lens in the fourth-B2 unit, and ν2n and θ2n respectively represent the Abbe number and a partial dispersion ratio of the material of the negative lens in the fourth-B2 unit.

3. The zoom lens according to claim 1, further comprising:
a lens unit provided between the fourth-F unit and the fourth-B unit, and configured to be insertable into and removable from an optical path so as to shift a focal length range of the entire system of the zoom lens.

4. The zoom lens according to claim 1, wherein the following conditions are satisfied:

$$-1.1 < f1p/f1n < -0.3$$

$$-1.3 < f2p/f2n < -0.5$$

where f1p and f2p represent combined focal lengths of the positive lenses in the fourth-B1 unit and the fourth-B2 unit respectively, and f1n and f2n represent focal lengths of the negative lenses in the fourth-B1 unit and the fourth-B2 unit respectively.

5. The zoom lens according to claim 1, wherein the zoom lens is adapted to form an image on a photoelectric conversion element.

6. The zoom lens according to claim 5, wherein the following condition is satisfied:

$$0.32 < fw/IS < 0.47$$

where IS represents a diagonal length of an effective region of the photoelectric conversion element, and fw represents a focal length of the entire system of the zoom lens at the wide angle end.

7. An image pickup apparatus comprising:
a photoelectric conversion element; and
a zoom lens comprising:
a first lens unit that does not move for zooming and that has a positive refractive power;
a second lens unit that is configured to move to an image side during zooming from a wide angle end to a telephoto end, and that has a negative refractive power;
a third lens unit that is configured to reduce image plane variation due to zooming; and
a fourth lens unit that does not move for zooming,
wherein the first to fourth lens units are arranged in that order from an object side to the image side of the zoom lens,
wherein the fourth lens unit includes a fourth-F unit and a fourth-B unit that are arranged in that order from the object side and facing each other across the longest air gap in the fourth lens unit,
wherein the fourth-B unit comprises two negative lenses and at least three positive lenses, and consists of or includes a fourth-B1 unit and a fourth-B2 unit,
wherein the center of a thickness of at least one lens included in the fourth-B1 unit is closer to the object side than the center of a total length of the fourth-B unit, and the center of a thickness of at least one lens included in the fourth-B2 unit is closer to the image side than the center of the total length of the fourth-B unit,
wherein each of the fourth-B1 unit and the fourth-B2 unit includes one negative lens and one positive lens, and
wherein the following conditions are satisfied:

$$0.50 < v1p/v1n < 1.10$$

$$2.30 < v2p/v2n$$

where v1p represents an average of Abbe number of material of the at least one positive lens in the fourth-B1 unit, v2p represents an average of Abbe number of material of the at least one positive lens in the fourth-B2 unit, v1n represents an average of Abbe number of material of the at least one negative lens in the fourth-B1 unit, and v2n represents an average of Abbe number of material of the at least one negative lens in the fourth-B2 unit, the zoom lens being arranged to form a subject image on the photoelectric conversion element.

* * * * *